United States Patent Office 3,579,514
Patented May 18, 1971

3,579,514
7 - [α-(3 - GUANYL-1-UREIDO)ARYL-ACETAMIDO] CEPHALOSPORANIC ACIDS AND DERIVATIVES THEREOF
Donald Neil McGregor, Fayetteville, N.Y., assignor to Bristol-Myers Company, New York, N.Y.
No Drawing. Filed Jan. 24, 1969, Ser. No. 793,909
The portion of the term of the patent subsequent to May 18, 1988, has been disclaimed
Int. Cl. C07d 99/24
U.S. Cl. 260—243C    27 Claims

ABSTRACT OF THE DISCLOSURE

7-[α-(3-guanyl-1-ureido)phenylacetamido]- and 7-[α-(3 - guanyl - 1 - ureido)thienylacetamido]cephalosporanic acids and the corresponding betaines and desacetoxy derivatives are valuable as antibacterial agents, as nutritional supplements in animal feeds and as therapeutic agents in poultry and animals, including man, and are especially useful in the treatment of infectious diseases caused by Gram-positive and Gram-negative bacteria, most particularly those caused by the Pseudomonas genus. 7 - [D - α - (3-guanyl-1-ureido)phenylacetamido]cephalosporanic acid, a preferred embodiment of the invention, is prepared by the treatment of 7-(D-α-amino-phenylacetamido)cephalosporanic acid with a guanylcarbamoylating agent.

BACKGROUND OF THE INVENTION (1) Field of the invention

The cephalosporins of the present invention possess the usual attributes of such compounds and are particularly useful in the treatment of Pseudomonas infections.

(2) Description of the prior art

Cephalothin and cephaloridine are well-known antibacterial agents. The literature also contains considerable data on the activity of cephaloglycin and cephalexin. The literature on cephalosporins has been reviewed by E. P. Abraham, Quart. Rev. (London), 21, 231 (1967), by E. Van Heyningen, Advan. Drug Res., 4, 1–70 (1967), and briefly by L. C. Cheney, Annual Reports in Medicinal Chemistry, 1967, Academic Press Inc., 111 Fifth Avenue, New York, N.Y., 10003, on pages 96 and 97.

The preparation of various 7-[α-amino-arylacetamido]-cephalosporanic acids and the corresponding desacetoxy compounds in which aryl represents unsubstituted or substituted phenyl or 2- or 3-thienyl is described in British specifications 985,747, 1,017,624, 1,054,806 and 1,123,-333, in Belgian Pat. 696,026 (Farmdoc No. 29,494), in U.S. Pats. 3,311,621 and 3,352,858, in Japanese Pat. 16,871/66 (Farmdoc No. 23,231), by Spencer et al., J. Med. Chem., 9 (5), 746–750 (1966) and by Kurita et al., J. Antibiotics (Tokyo) (A) 19, 243–249 (1966).

SUMMARY OF THE INVENTION

This invention comprises compounds having the formula

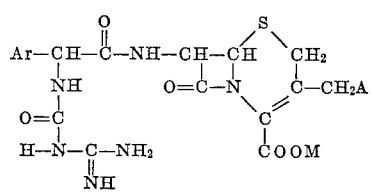

wherein Ar is 2-thienyl, 3-thienyl or

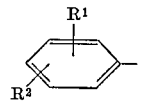

in which each of $R^1$ and $R^2$ is hydrogen, nitro, di(lower)alkylamino, (lower)alkanoylamino, amino, hydroxy, (lower)alkanoyloxy, (lower)alkyl (comprising straight and branched chain saturated aliphatic groups having from one to six carbon atoms inclusive), (lower)alkoxy, sulfamyl, chloro, iodo, bromo, fluoro or trifluoromethyl;

A is hydrogen, acetoxy, pyridinium, picolinium or lutidinium; and

M is hydrogen, a pharmaceutically acceptable, nontoxic cation or an anionic charge when A is one of said quaternary ammonium radicals.

Typical nontoxic, pharmaceutically acceptable metallic cations include sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N' - dibenzylethylenediamine, dehydroabietylamine, N,N'-bis-dehydroabietylethylenediamine, N-(lower)alkylpiperidine, e.g., N-ethylpiperidine, or other such amines which have been used to form pharmaceutically acceptable nontoxic salts with benzylpenicillin. Where A is hydrogen or acetoxy these compounds are preferably prepared by treatment of the corresponding α-amino compound with a guanylcarbamoylating agent.

In the preferred embodiments of the present invention, Ar is phenyl or thienyl and A is hydrogen or acetoxy and M is hydrogen, sodium or potassium.

Another preferred embodiment of the present invention comprises compounds having the formula

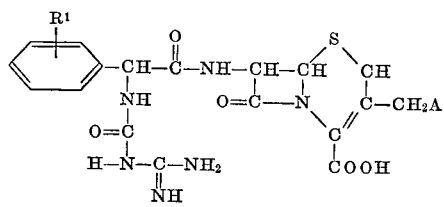

wherein $R^1$ is nitro, acetamido, methoxy, chloro, iodo or fluoro and A is hydrogen or acetoxy and particularly those in which $R^1$ is hydroxy or chloro.

Within all these groups it is preferred that the α-carbon of the cephalosporin side chain (to which the guanylureido group is attached) be of the D configuration.

DETAILED DESCRIPTION

Antibacterial agents such as ampicillin and cephalothin have proved highly effective in the past in the therapy of infections due to Gram-positive and Gram-negative bacteria but these compounds have been notably lacking in their ability to effectively control Pseudomonas infection. Carbenicillin is active against Pseudomonas only in high concentrations and is useful in such infections in man only when given by injection.

The compounds of the present invention as defined above under "Summary of the Invention" are particularly useful in that they possess antibacterial activity against both Gram-positive and Gram-negative bacteria, and most particularly exhibit activity against *Pseudomonas aeruginosa* infections.

The α-carbon atom of the cephalosporin side chain (to which the guanylureido group is attached) is an asymmetric carbon atom and the compounds of this invention can therefore exist in two optically active isomeric forms [the D- and L-diastereoisomers], as well as in the DL form which is a mixture of the two optically active forms; all such isomeric forms of the compounds are included within the scope of the present invention but the D form is preferred. Also included within the scope of the present invention are easily hydrolyzed esters which are converted to the free acid form by chemical or enzymatic hydrolysis including those of the type described in U.S. Pat. 3,284,-451.

It should be noted in connection with the foregoing consideration of the diastereoisomers of this invention that isomers other than the two caused by the asymmetric carbon of the side chain are possible due to the presence of asymmetric carbon atoms in the 7-aminocephalosporanic acid nucleus. Such additional isomers, however, are not presently significant since 7-aminocephalosporanic acid which is the product of fermentation processes is consistently of one configuration; such 7-aminocephalosporanic acid is presently used in the production of the compounds of this invention.

One method for the preparation of certain compounds of the present invention comprises mixing a compound having the formula

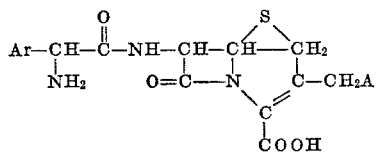

wherein A is hydrogen or acetoxy and Ar is as defined above or a monohydrate or polyhydrate or salt thereof, with a guanylcarbamoylating agent preferably in a ratio of 1.0 to 1.5 moles of said agent per mole of the cephalosporin in the presence of a base, preferably an organic base such as N-methylpiperidine, tri(lower)alkylamine, or the like, but preferably in the presence of triethylamine, and preferably in a solvent such as water, dimethylformamide, dimethylsulfoxide chloroform, tetrahydrofuran, n-pentane, methylene chloride, but preferably water, while preferably maintaining the pH above 6 at a temperature in the range of about −20° C. to 50° C., but preferably about 0° C. to 20° C., preferably with agitation, to produce a compound having the formula

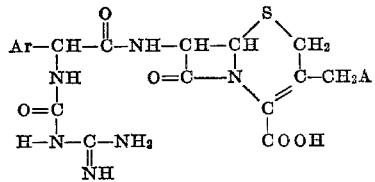

wherein A is hydrogen or acetoxy and Ar is as defined above, or a salt thereof. The betaines are produced by reacting the compounds above in which A is acetoxy with pyridine, picoline or lutidine by the method of Spencer et al., J. Org. Chem., 32, 500 (1967).

Another method for the preparation of the compounds of the present invention comprises reacting a compound of the formula

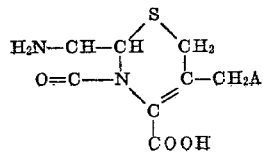

wherein A is hydrogen or acetoxy (preferably in the form of a neutral salt such as the sodium salt or the triethylamine salt) with an acid having the formula

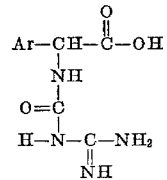

(wherein Ar is as defined above) or with its functional equivalent as an acylating agent for a primary amino group. The preferred reagent is the mixed anhydride prepared by reacting such an acid with isovaleryl chloride (or pivaloyl chloride) in the presence of a tertiary amine such as triethylamine as an acceptor of hydrogen chloride. Such equivalents include the corresponding carboxylic chlorides, bromides, acid anhydrides, including mixed anhydrides and particularly the mixed anhydrides prepared from acids such as the lower aliphatic monoesters of carbonic acid, of alkyl and aryl sulfonic acids and of more hindered acids such as diphenylacetic acid and isovaleric acid. In addition, an acid azide or an active ester or thioester (e.g. with p-nitrophenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2,684] or of a carbodiimide reagent [especially N,N'-dicyclohexylcarbodiimide, N,N'-diisopropylcarbodiimide or N-cyclohexyl - N' - (2-morpholinoethyl) carbodiimide; cf. Sheehan and Hess, J. Amer. Chem. Soc. 77, 1067, (1955)] or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodword, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Pats. Nos. 3,079,314, 3,117,126 and 3,129,224 and British Pats. Nos. 932,644, 957,570, and 959,054).

The compounds used in the present invention include 7-aminocephalosporanic acid. 7 - aminocephalosporanic acid is prepared by hydrolysis of cephalosporin C and has the formula

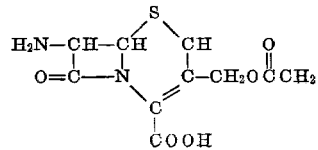

Treatment of cephalosporin C with a tertiary amine, e.g. pyridine, lutidines, picolines and the like, followed by acid hydrolysis produces a nucleus which, in the case of pyridine, has the formula

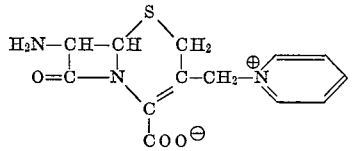

and has been given the name 3 - pyridiniummethyl-7-aminodecephalosporanic acid inner salt.

The foregoing nuclei and the preparation thereof are known in the art and are described for example in U.S. Pat. No. 3,117,126 and British Pats. Nos. 932,644, 957,570 and 959,054.

3 - methyl - 7 - aminodecephalosporanic acid having the formula

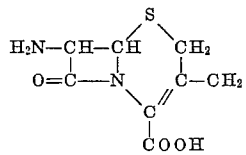

is produced by catalytic reduction of cephalosporin C followed by hydrolytic removal of the 5-aminoadipoyl side chain as described in U.S. Pat. No. 3,129,224.

The starting acids used above are prepared by replacing the cephalosporanic acid of the previous process with the simple amino acid of the formula

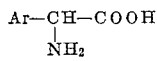

in the reaction with the guanylcarbamoylating agent.

The 7-[α-amino-arylacetamido]cephalosporanic acids and the corresponding desacetoxy compounds used above as starting materials are prepared from the corresponding α-azido-arylacetic acids and α-amino-arylacetic acids by the methods set out in the literature and particularly in the publications and patents listed above under the heading "Description of the prior art." Many other α-azido- and α-amino-arylacetic acids are described, for example, in U.S. Pats. 2,985,648, 3,140,282, 3,308,023, 3,316,-247, 3,342,677, 3,373,156 and 3,385,847 and British Pats. 903,785, 918,169, 978,178, 991,586 and 1,033,257 and in the chemical literature by Eksrom et al., Acta Chemica Scandinavica, 19 (2), 281–299 (1965), by A. H. Neims et al., Biochemistry (Wash.) 5 (1), 203–213 (1966) and by P. Friis et al., Acta Chemica Scandinavica, 17 (9), 2391–2396 (1963).

In the treatment of bacterial infections in man, the compounds of this invention are administered topically, orally and parenterally in accordance with conventional procedures for antibiotic administration in an amount of from about 5 to 125 mg./kg./day and preferably in the range of 15 to 50 mg./kg./day for Pseudomonas infections in divided dosages, e.g., three or four times a day. They are administered in dosage units containing, for example, 125, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

The guanylcarbamoylating agent used in the present invention is made by various methods known to the art, the most useful of which is disclosed by J. Thiele and E. Uhlfelder, Ann., 303, 107 (1898). A typical guanylcarbamoylating agent is the mixture of 4-guanylsemicarbazide with nitrous acid or a source thereof or an oxidizing agent such as iodine or equivalents thereof such as sodium hypochlorite or hypochlorous acid or chlorine. It is advantageous to conduct this oxidation in the presence of sufficient base to neutralize the acid formed during the oxidation of the hydrazine portion of the acyl hydrazide to its end product, nitrogen. Thus hydrogen iodide is formed when iodine is used. Both organic and inorganic bases are suitable. It is believed that these reactions lead to the formation of azidoformylguanidine and/or guanylisocyanate as the intermediate which reacts with the α-amino group of the cephalosporin to form the desired α-guanylureidocephalosporin but this is a matter of theory and is not essential to the conduct of the process of the present invention. Amidinocarbamoyl is a recognized synonym for guanylcarbamoyl.

Illustrative examples of the preparation of compounds of the present invention follow. In the title of each example the moiety

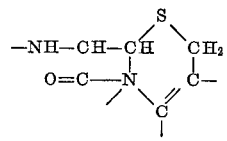

is represented simply by

Thus, 7-aminocephalosporanic acid would be written as

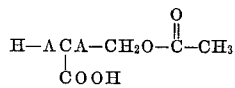

These examples are given in illustration of, but not in limitation of, the present invention. All temperatures are in degrees centigrade. "Skellysolve B" is a petroleum ether fraction of B.P. 60–68° C. consisting essentially of n-hexane.

DESCRIPTION OF THE PREFERRED EMBODIMENTS

Example 1

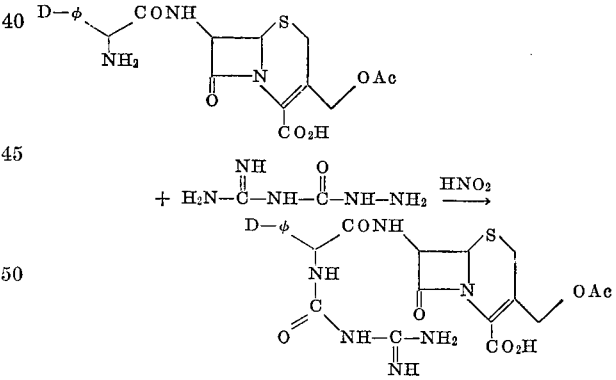

D(—)-α - t - butoxycarboxamidophenylacetic acid.—A mixture of 30.0 g. (0.2 mole) of D(—)-2-phenylglycine and 16.0 g. (0.4 mole) of magnesium oxide powder was intimately mixed by grinding in a mortar. The mixture was suspended in 500 ml. of 50% aqueous dioxane and 58.0 g. (0.4 mole) of 1-butoxycarbonyl azide [Commercial sample from Aldrich; t-butoxycarbonyl chloride (t-butylchloroformate) is reported to be unstable above 10°] was added dropwise with vigorous stirring. The reaction mixture was heated with stirring for 20 hours at 45–50°. The cooled mixture was then diluted with 2 l. of ice-water and 500 ml. of ethyl acetate with stirring. A small amount of solid was removed by filtration and the filtrate was separated into its component layers. The organic phase was extracted with 150 ml. portions of 3% sodium bicarbonate solution and water. These extracts were combined with the aqueous phase above and the solution was cooled and acidified to pH 5. (It is presumed that lowering the pH further would result in the liberation of hydrazoic acid.) The product was extracted into ethyl acetate (3× 250 ml.) and the combined extracts were washed with water and dried over magnesium sulfate. Evaporation of the solvent gave an oil which was solidified by trituration with "Skellysolve B" and ether. This procedure afforded 29.5 g. of white crystals of M.P. 88–90° dec.; $[\alpha]^{23}$ —135° (c.=1.0, $CH_3OH$). The mother liquors afforded a second crop of 10.5 g., M.P. 86–88°. Total yield 40.0 g. 80%.

7-[D-α-t-butoxycarboxamidophenylacetamido]cephalosporanic acid.—(J. L. Spencer et al., J. Med. Chem., 9, 746 (1966)). A solution of 42.7 g. (0.17 mole) of D(—)-t-butoxycarboxamidophenylacetic acid and 17.2 g. of (0.17 mole) of triethylamine in 600 ml. of tetrahydrofuran (THF) was cooled to —10°. 18.5 g. (0.17 mole) of ethyl chloroformate was added dropwise with stirring, and the mixture was stirred for 10 min. at —10°. To the mixed anhydride solution thus formed was added in one portion a cold (0°) solution of 46.3 g. (0.17 mole) of 7-aminocephalosporanic acid and 17.2 g. of (0.17 mole) of triethylamine in 600 ml. of 50% aqueous THF. The mixture was stirred for 1 hour at 0–5°, and the THF was then removed under reduced pressure. (Any solid material at this stage should be removed by filtration.) The residue was dissolve in a mixture of 1 l. of cold water and 400 ml. of ethyl acetate, and after a brief shaking the layers were separated. The aqueous phase was cooled, layered with ethyl acetate and 42% phosphoric acid was added to pH 3 with stirring. The phases were separated and an extraction was made with fresh ethyl acetate. The combined extracts were washed with cold water, dried over magnesium sulfate and the solvent was removed under reduced pressure. After trituration with ether and "Skellysolve B" the residual oil solidified to give 62.5 g. (72.5%) of 7-[D-α-t-butoxycarboxamidophenylacetamido]cephalosporanic acid.

7-[D-α - aminophenylacetamido]cephalosporanic acid, cephaloglycin.—A solution of 13.5 g. of 7-[D-α-t-butoxycarboxamidophenylacetamido]cephalosporanic acid in 400 ml. of 45% formic acid was stored at 40° for 3 hours. The solvent was then removed under reduced pressure, and the last traces of formic acid were removed by azeotropic distillation under reduced pressure with toluene. The oily residue was treated with 75 ml. of ethyl acetate plus 5 ml. of water, which caused solidification. The solid was triturated with ether and collected by filtration. After drying in vacuo over $P_2O_5$, there was obtained 10.0 g. (88.5%) of crystalline cephaloglycin, $[\alpha]^{23}+81°$ (c.=1.0, 50% aqueous acetonitrile).

N guanyl-N'-nitrourea.—To a stirred, ice-cooled mixture of 100 ml. of concentrated sulfuric acid and 40 ml. of concentrated nitric acid was added (caution!) in small portions over 40 min., 25 g. (0.3 mole) of cyanoguanidine (Eastman). After the addition was complete, the reaction mixture was kept at about 0° for 1.5 hrs. with occasional swirling, then was poured into 1000 g. of ice. The precipitate was removed by filtration and washed with water. Without drying, the precipitate was suspended in 200 ml. of water and dissolved by the addition of 10% aqueous NaOH. The resulting solution was filtered, then the product was precipitated by bubbling $CO_2$ through the solution for 1 hr. The solid was removed by filtration, washed with $H_2O$, and dried, yielding 38.6 g. (88%), M.P.>250°.

Analysis.—Calcd. for $C_2H_5N_5O_3$ (percent): C, 16.3; H, 3.43; N, 47.96. Found (percent): C, 16.63; H, 3.65; N, 47.6.

4-guanylsemicarbazide dihydrochloride.—A suspension of 5.88 g. (0.04 mole) of N-guanyl-N'-nitrourea in 31.8 ml. of concentrated HCl was cooled by the addition of about 15 g. of ice and storage in an ice bath. The suspension was added over 45 min. to a vigorously stirred, ice-cooled mixture of 12.96 g. (0.18 mole) of zinc dust and about 300 g. of ice. After the addition was completed, the mixture was stored for 10 min. without external cooling and then was filtered. The filtrate was shaken vigorously with 5 ml. (0.05 mole) of benzaldehyde, and the colorless precipitate which separated was quickly removed by filtration and dried under reduced pressure, yielding 3.0 g. of the benzal derivative of 4-guanylsemicarbazide dihydrochloride M.P. 237°. Without purification, 3.5 g. of the benzal derivative was suspended in 5 ml. of ethanol, then 50 ml. of concentrated HCl was added and the mixture was stored at 40° for 1 hr. The insoluble crystalline product was collected by filtration and recrystallized from water-ethanol, yielding 1.0 g. of 4-guanylsemicarbazide dihydrochloride, M.P. 191°.

7-[D-α-(3-guanyl-1-ureido)-phenylacetamido]-cephalosporanic acid.—To a cooled (ice-salt) solution of 0.600 g. (3.54 mmoles) of 4-guanylsemicarbazide dihydrochloride in 3.6 ml. of water was added a solution of 0.210 g. (3.14 mmoles) of $NaNO_2$ in 0.8 ml. of water. The resulting solution was stirred for 10 minutes and then was added to a solution of 1.0 g. (2.36 mmoles) of 7-(D-α-aminophenylacetamido)-cephalosporanic acid (cephaloglycin) in 4.2 ml. of water containing sufficient triethylamine to bring the pH to 9.0. The pH of the combined solutions was adjusted to 6.5 with triethylamine, then the solution was stirred with ice cooling for 10 minutes. The product was removed by filtration and dried under reduced pressure, yielding 0.468 g. An additional 0.135 g. of product was obtained by lowering the pH of the filtrate to 6.0 and cooling in ice. The total yield of 7-[D-α-(3-guanyl-1-ureido)-phenylacetamido]-cephalosporanic acid was 0.603 g., M.P. 195° dec.

Calc'd for $C_{20}H_{22}N_6O_7S \cdot 2H_2O$ (percent): C, 45.62; H, 4.98; N, 15.96. Found (percent): C, 45.58; H, 4.73; N, 15.69.

The product may be recrystallized in 50% yield by dissolving it in 12.5 parts of water with triethylamine at pH 10.0 with ice cooling and then adjusting the pH to 6.5. The crystalline product is collected by filtration and dried under reduced pressure.

The minimum inhibitory concentration (M.I.C.) of this product in mcg./ml. versus a strain of Pseudomonas aeruginosa was determined by overnight incubation at 37° C. in nutrient broth by serial two-fold tube dilution and found to be 16 mcg./ml.; in the same experiment the M.I.C. for cephalothin was found to be 250 mcg./ml.

The median curative dose ($CD_{50}$) in mgm./kg. against an overwhelmingly lethal challenge with Str. pyrogenes was determined by intramuscular injection of this product in mice of the indicated dosage at the time of challenge and again 4 hours later; thus a dose of 36 mgm./kg. given at each of these two times is reported as 36×2. Deaths were counted for 72 hours after challenge. The $CD_{50}$ found for this product was 3.7×2 mgm./kg.; the $CD_{50}$ for cephalothin in the same experiment was 5×2. mgm./kg.

Example 2

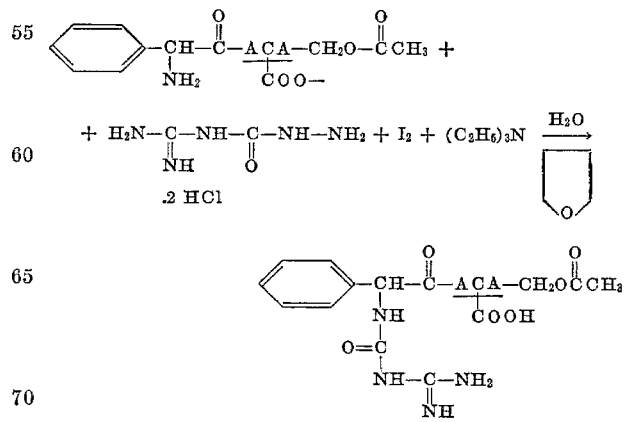

7 - [D - α - (3-guanyl-1-ureido) - phenylacetamido]cephalosporanic acid.—To a stirred, ice-cooled solution of 1 mmole of cephaloglycin and 0.190 g. (1 mmole) of 4-guanylsemicarbazide dihydrochloride in 3.5 ml. of $H_2O$ and 2.5 ml. of tetrahydrofuran is added 0.98 ml. (7 mmole) of triethylamine. A solution of 0.51 g. (2 mmole) of iodine in 2.0 ml. of tetrahydrofuran is then added dropwise over about 30 seconds until the reaction mixture acquires a permanent iodine color. Stirring with ice cooling is continued for 5 minutes, then 10% aqueous sodium thiosulfate is added dropwise to take up the excess iodine. The reaction mixture is concentrated under reduced pressure to remove most of the tetrahydrofuran, then, with ice cooling, the pH is lowered to 6.4 with 1 N HCl. After storage in ice for 45 min., the precipitate is collected by centrifugation, washed with water and dried to give 7-[D-α - (3 - guanyl-1-ureido)-phenylacetamido]cephalosporanic acid.

Example 3

7 - [D - α - (3-guanyl-1-ureido)-2-thienylacetamido]-cephalosporanic acid and 7-[D-α-(3-guanyl-1-ureido)-3-thienylacetamido]cephalosporanic acid, respectively, are prepared by substituting an equimolar weight of 7-(D-α-amino - 2 - thienylacetamido)cephalosporanic acid and 7-(D - α - amino - 3 - thienylacetamido)cephalosporanic acid, respectively, for the cephaloglycin in the procedure of Example 2.

Example 4

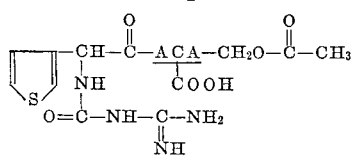

7 - [D - α - (3-guanyl-1-ureido)-2-thienylacetamido] cephalosporanic acid.—A solution is prepared by combining an ice-cooled solution of 1.2 g. (6.28 mmoles) of 4-guanylsemicarbazide dihydrochloride in 7.2 ml. of H₂O with a solution of 0.42 g. (6.28 mmoles) of NaNO₂ in 1.6 ml. of H₂O and allowing the mixture to stir at 0° for 10 min. This solution is added to a stirred, ice-cooled solution prepared by suspending 4.72 mmoles of 7-[D-α-amino-3-thienylacetamido)cephalosporanic acid, in 6 ml. of H₂O and adding sufficient triethylamine to bring the pH to 9.0. The pH of the resulting mixture is adjusted to 6 with triethylamine. After 10 min., the precipitate is removed by filtration and dried under reduced pressure to give solid 7-[D-α-(3-guanyl-1-ureido) - 3 - thienylacetamido]cephalosporanic acid. Additional product is obtained by lowering the pH of the filtrate to 5.0 with 42% H₃PO₄, stirring for 30 min. at 0° and then removing the precipitate by filtration and drying under reduced pressure. If desired, the product is purified by dissolving it in 5 ml. of H₂O at pH 9.0 with triethylamine with ice cooling and then acidifying to pH 5.5 with 42% H₃PO₄ and collecting and drying the crystals.

Example 5

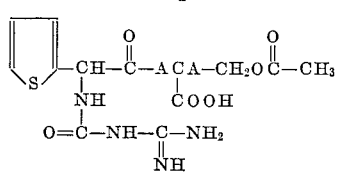

7 - [D - α - (3-guanyl-1-ureido)-2-thienylacetamido]-cephalosporanic acid.—An ice salt cooled solution of 1.2 g. of 4-guanylsemicarbazide dihydrochloride in 7.2 ml. of H₂O is combined with a solution of 0.420 g. of NaNO₂ in 1.6 ml. of H₂O and stirred for 10 min. at 0°. This solution is then added to an ice-cooled solution of 4.72 mmoles of 7 - (D-α-amino-2-thienylacetamido)cephalosporanic acid in 6 ml. of H₂O containing sufficient triethylamine to bring the pH to 10.0. After stirring 20 min. at 0°, the precipitate is collected and dried. The filtrate is acidified to pH 5 and stirred with ice cooling for 15 min. The precipitate is collected, dried and reprecipitated twice by dissolving in cold water with the minimum amount of base and then acidifying to pH 6, yielding solid 7-[D-α-(3 - guanyl - 1 - ureido) - 2 - thienylacetamido]cephalosporanic acid.

Example 6

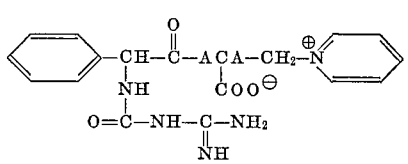

7 - [D - α - (3 - guanyl - 1 ureido)phenylacetamido]-3 - (1 - pyridylmethyl) - 3 - cephem - 4 - carboxylic acid betaine.—A stirred mixture of 1.3 g. of sodium 7-[D-α-(3 - guanyl - 1 - ureido)phenylacetamido] - cephalosporanate, 4.5 g. of potassium thiocyanate, 0.5 ml. of pyridine and two ml. of water is adjusted to pH 6.5 with 85% phosphoric acid and heated at 60° for five hours. The reaction mixture is diluted with water to a volume of about 30 ml. and extracted four times with chloroform. Residual chloroform is removed at reduced pressure. Acidification (6 N hydrochloric acid) of the aqueous phase to pH 2.0 gives a white precipitate which is dried over phosphorus pentoxide. This material plus six ml. of water and six ml. of a 25% solution of "Amberlite LA–1" resin acetate form in methyl isobutyl ketone is stirred for one hour. An additional 20 ml. of water and 6 ml. of resin are added and stirring continued for another hour. The reaction mixture is extracted four times with methyl isobutyl ketone. The aqueous phase is concentrated to dryness. The solid residue is triturated with anhydrous ether and filtered giving, after drying in vacuo over phosphorus pentoxide, solid 7 - [D - α - guanyl - 1-ureido)-phenylacetamido] - 3 - (1 - pyridylmethyl) - 3-cephem - 4 - carboxylic acid betaine.

Example 7

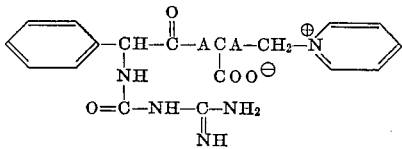

7 - [D - α - (3 - guanyl - 1 - ureido)phenylacetamido] 3 - (1 - pyridylmethyl) - 3 - cephem - 4 - carboxylic acid betaine.—A stirred mixture of 7.5 g. of sodium 7-[D-α-(3 - guanyl - 1 - ureido)phenylacetamido] - cephalosporanate, 8.1 g. of potassium thiocyanate, 1.5 ml. of pyridine, and 6–10 ml. of water is adjusted to pH 6.5 with 42% phosphoric acid and heated at 60° for five hours. The reaction mixture is diluted with water and extracted with chloroform, a quantity of insoluble material (solid A) being removed by filtration. The aqueous phase is extracted four additional times with chloroform and any residual chloroform removed at reduced pressure. The aqueous phase is adjusted to pH 2.0 giving a solid which is collected by filtration, washed with water and air dried as solid B. Solid A is again treated with pyridine and potassium thiocyanate as above giving recovered solid A and more of solid B on adjusting the aqueous phase to 2.0. An aqueous suspension of recovered solid A is adjusted to pH 2.0. After stirring the product is collected by filtration and washed with water. This material is identical with solid B. The combined crops of solid B are stirred for 2½ hours at room temperature with 30 ml. of water and 30 ml. of a 25% solution of "Amberlite LA–1" resin acetate form in methyl isobutyl ketone [Spencer et al., J. Med. Chem. 9, 746 (1966), footnote 14]. The crystalline prouct, 7 - [D - α - (3 - guanyl - 1 - ureido)phenylacetamido] - 3 -(1 - pyridylmethyl) - 3 - cephem - 4-carboxylic acid betaine, is collected by filtration and washed with methyl isobutyl ketone.

Example 8

Substitution on the procedures of Examples 6 and 7 for the sodium 7 - [D - α - (3 - guanyl - 1 - ureido)phenylacetamido]cephalosporanate used therein of an equimolar weight of sodium 7 - [D - α - (3 - guanyl - 1 - ureido) - 2 - thienylacetamido]cephalosporanate acid and sodium 7-[D-α - (3 - guanyl - 1 - ureido) - 3 - thienylacetamido]cephalosporanate acid, respectively, produces 7-[D-α-(3-guanyl - 1 - ureido) - 2 - thienylacetamido] - 3 - (1-pyridylmethyl) - 3 - cephem - 4 - carboxylic acid betaine and 7 - [D - α - (3 - guanyl - 1 - ureido) - 3 - thienylacetamido] - 3 - (1 - pyridylmethyl) - 3 - cephem - 4-carboxylic acid betaine, respectively.

Example 9

Substitution in the procedure of Example 1 for the 7-aminocephalosporanic acid used therein of an equimolar weight of 7-aminodesacetoxycephalosporanic acid and for the D-α-aminophenylacetic acid used therein of an equimolar weight of D-α-amino-2-thienylacetic acid,
D-α-amino-3-thienylacetic acid,
D-α-amino-m-nitrophenylacetic acid,
D-α-amino-m-aminophenylacetic acid,
DL-α-amino-p-methylphenylacetic acid,
DL-α-amino-m-methylphenylacetic acid,
DL-α-amino-p-chlorophenylacetic acid
DL-α-amino-m-chlorophenylacetic acid,
DL-α-amino-p-methoxyphenylacetic acid,
DL-α-amino-m-methoxyphenylacetic acid,
DL-α-amino-p-fluorophenylacetic acid,
DL-α-amino-m-fluorophenylacetic acid,
DL-α-amino-p-hydroxyphenylacetic acid,
DL-α-amino-m-hydroxyphenylacetic acid,
DL-α-amino-p-aminophenylacetic acid,
DL-α-amino-m-aminophenylacetic acid,
DL-α-amino-m-nitrophenylacetic acid,
DL-α-amino-p-dimethylaminophenylacetic acid,
DL-α-amino-m,p-dimethoxyphenylacetic acid,
D-α-amino-p-iodophenylacetic acid,
D-α-amino-m-iodophenylacetic acid,
D-α-amino-m-chloro-p-hydroxyphenylacetic acid,
D-α-amino-p-methoxyphenylacetic acid,
D-α-amino-p-hydroxyphenylacetic acetic acid,
D-α-amino-m-methoxyphenylacetic acid,
D-α-amino-m-hydroxyphenylacetic acid,
D-α-amino-p-acetamidophenylacetic acid,
D-α-amino-aminophenylacetic acid, and
D-α-amino-m-acetamidophenylacetic acid, respectively, produces sodium 7-[D-α-(3-guanyl-1-ureido)-2-thienylacetamido]desacetoxycephalosporanate,
sodium 7-[D-α-(3-guanyl-1-ureido)-3-thienylacetamido]desacetoxycephalosporanate,
sodium 7-[D-α-(3-guanyl-1-ureido)-m-nitrophenylacetamido]desacetoxycephalosporanate,
sodium 7-[D-α-(3-guanyl-1-ureido)-m-aminophenylacetamido]desacetoxycephalosporanate,
sodium 7-[DL-α-(3-guanyl-1-ureido)-p-methylphenylacetamido]desacetoxycephalosporanate,
sodium 7-[DL-α-(3-guanyl-1-ureido)-m-methylphenylacetamido]desacetoxycephalosporanate,
sodium 7-[DL-α-(3-guanyl-1-ureido)-p-chlorophenylacetamido]desacetoxycephalosporanate,
sodium 7-[DL-α-(3-guanyl-1-ureido)-m-chlorophenylacetamido]desacetoxycephalosporanate,
sodium 7-[DL-α-(3-guanyl-1-ureido)-p-methoxyphenylacetamido]desacetoxycephalosporanate,
sodium 7-[DL-α-(3-guanyl-1-ureido)-m-methoxyphenylacetamido]desacetoxycephalosporanate,
sodium 7-[DL-α-(3-guanyl-1-ureido)-p-fluorophenylacetamido]desacetoxycephalosporanate,
sodium 7-[DL-α-(3-guanyl-1-ureido)-m-fluorophenylacetamido]desacetoxycephalosporanate,
sodium 7-[DL-α-(3-guanyl-1-ureido)-p-hydroxyphenylacetamido]desacetoxycephalosporanate,
sodium 7-[DL-α-(3-guanyl-1-ureido)-m-hydroxyphenylacetamido]desacetoxycephalosporanate,
sodium 7-[DL-α-(3-guanyl-1-ureido)-p-aminophenylacetamido]desacetoxycephalosporanate,
sodium 7-[DL-α-(3-guanyl-1-ureido)-m-aminophenylacetamido]desacetoxycephalosporanate
sodium 7-[DL-α-(3-guanyl-1-ureido)-m-nitrophenylacetamido]desacetoxycephalosporanate,
sodium 7-[DL-α-(3-guanyl-1-ureido)-p-dimethylaminophenylacetamido]desacetoxycephalosporanate,
sodium 7-[DL-α-(3-guanyl-1-ureido)-m, p-dimethoxyphenylacetamido]desacetoxycephalosporanate,
sodium 7-[D-α-(3-guanyl-1-ureido)-p-iodophenylacetamido]desacetoxycephalosporanate,
sodium 7-[D-α-(3-guanyl-1-ureido)-m-iodophenylacetamido]desacetoxycephalosporanate,
sodium 7-[D-α-(3-guanyl-1-ureido)-m-chloro-p-hydroxyphenylacetamido]-desacetoxycephalosporanate,
sodium 7-[D-α-(3-guanyl-1-ureido)-p-methoxyphenylacetamido]desacetoxycephalosporanate,
sodium 7-[D-α-(3-guanyl-1-ureido)-p-hydroxyphenylacetamido]desacetoxycephalosporanate,
sodium 7-[D-α-(3-guanyl-1-ureido)-m-methoxyphenylacetamido]desacetoxycephalosporanate,
sodium 7-[D-α-(3-guanyl-1-ureido)-m-hydroxyphenylactamido]desacetoxycephalosporanate,
sodium 7-[D-α-(3-guanyl-1-ureido)-p-actamidophenylacetamido]desacetoxycephalosporanate,
sodium 7-[D-α-(3-guanyl-1-ureido)-m-aminophenylacetamido]desacetoxycephalosporanate and
sodium 7-[D-α-(3-guanyl-1-ureido)-m-acetamidophenylacetamido]desacetoxycephalosporanate, respectively.

Example 10

Substitution in the procedure of Example 1 for the D-(—)-2-phenylglycine acid used therein of an equimolar weight of D-α-amino-m-nitrophenylacetic acid,
D-α-amino-m-aminophenylacetic acid,
DL-α-amino-p-methylphenylacetic acid,
DL-α-amino-m-methylphenylacetic acid,
DL-α-amino-p-chlorophenylacetic acid,
DL-α-amino-m-chlorophenylacetic acid,
DL-α-amino-p-methoxyphenylacetic acid,
DL-α-amino-m-methoxyphenylacetic acid,
DL-α-amino-p-fluorophenylacetic acid,
DL-α-amino-m-fluorophenylacetic acid,
DL-α-amino-p-hydroxyphenylacetic acid,
DL-α-amino-m-hydroxyphenylacetic acid,
DL-α-amino-p-aminophenylacetic acid,
DL-α-amino-m-aminophenylacetic acid,
DL-α-amino-m-nitrophenylacetic acid,
DL-α-amino-p-dimethylaminophenylacetic acid,
DL-α-amino-m,p-dimethoxyphenylacetic acid,
D-α-amino-p-iodophenylacetic acid,
D-α-amino-m-iodophenylacetic acid,
D-α-amino-m-chloro-p-hydroxyphenylacetic acid,
D-α-amino-p-methoxyphenylacetic acid,
D-α-amino-p-hydroxyphenylacetic acid,
D-α-amino-m-methoxyphenylacetic acid,
D-α-amino-m-hydroxyphenylacetic acid,
D-α-amino-p-acetamidophenylacetic acid,
D-α-amino-m-aminophenylacetic acid, and
D-α-amino-m-acetamidophenylacetic acid, respectively, produces sodium 7-[D-α-(3-guanyl-1-ureido)-m-nitrophenylacetamido]cephalosporanate,
sodium 7-[D-α-(3-guanyl-1-ureido)-m-aminophenylacetamido]cephalosporanate,
sodium 7-[DL-α-(3-guanyl-1-ureido)-p-methylphenylacetamido]cephalosporanate, sodium 7-[DL-α-(3-guanyl-1-ureido)-m-methylphenyl-acetamido]cephalosporanate,
sodium 7-[DL-α-(3-guanyl-1-ureido)-p-chlorophenyl-acetamido]cephalosporanate,
sodium 7-[DL-α-(3-guanyl-1-ureido)-m-chlorophenyl-acetamido]cephalosporanate,
sodium 7-[DL-α-(3-guanyl-1-ureido)-p-methoxyphenyl-acetamido]cephalosporanate,
sodium 7-[DL-α-(3-guanyl-1-ureido)-m-methoxyphenyl-acetamido]cephalosporanate,
sodium 7-[DL-α-(3-guanyl-1-ureido)-p-fluorophenylacet-amido]cephalosporanate,
sodium 7-[DL-α-(3-guanyl-1-ureido)-m-fluorophenylacet-amido]cephalosporanate,
sodium 7-[DL-α-(3-guanyl-1-ureido)-p-hydroxyphenyl-acetamido]cephalosporanate,
sodium 7-[DL-α-(3-guanyl-1-ureido)-m-hydroxyphenyl-acetamido]cephalosporanate,
sodium 7-[DL-α-(3-guanyl-1-ureido)-p-aminophenyl-acetamido]cephalosporanate,
sodium 7-[DL-α-(3-guanyl-1-ureido)-m-aminophenyl-acetamido]cephalosporanate,
sodium 7-[DL-α-(3-guanyl-1-ureido)-m-nitrophenyl-acetamido]cephalosporanate,
sodium 7-[DL-α-(3-guanyl-1-ureido)-p-dimethylamino-phenylacetamido]cephalosporanate,
sodium 7-[DL-α-(3-guanyl-1-ureido)-m,p-dimethoxy-phenylacetamido]cephalosporanate,
sodium 7-[D-α-(3-guanyl-1-ureido)-p-iodophenyl-acetamido]cephalosporanate,
sodium 7-[D-α-(3-guanyl-1-ureido)-m-iodophenyl-acetamido]cephalosporanate,
sodium 7-[D-α-(3-guanyl-1-ureido)-m-chloro-p-hy-droxyphenylacetamido]cephalosporanate,
sodium 7-[D-α-(3-guanyl-1-ureido)-p-methoxyphenyl-acetamido]cephalosporanate,
sodium 7-[D-α-(3-guanyl-1-ureido)-p-hydroxyphenyl-acetamido]cephalosporanate,
sodium 7-[D-α-(3-guanyl-1-ureido)-m-methoxyphenyl-acetamido]cephalosporanate,
sodium 7-[D-α-(3-guanyl-1-ureido)-m-hydroxyphenyl-acetamido]cephalosporanate,
sodium 7-[D-α-(3-guanyl-1-ureido)-p-acetamidophenyl-acetamido]cephalosporanate,
sodium 7-[D-α-(3-guanyl-1-ureido)-m-aminophenyl-acetamido]cephalosporanate, and
sodium 7-[D-α-(3-guanyl-1-ureido)-m-acetamido-phenylacetamido]cephalosporanate, respectively.

The preparation of each of these α-amino acids is described in either U.S. Pats. 3,198,804 and 3,342,677 or by Friis et al., Acta Chem. Scand. 17, 2391–2396 (1966) or by Neims et al., Biochemistry (Wash.) 5, 203–213 (1966) or in the section below entitled Illustrative Preparations of Starting Reagents.

Each of these α-amino acids is also converted to the corresponding substituted cephaloglycin by each of the two general procedures described by Spencer et al., J. Med. Chem. 9(5), 746–750 (1966) and references cited therein which involve the use of an N-p-nitrobenzyloxy carbonyl protecting group and a β-dicarbonyl protecting group, respectively. For the latter, methyl acetoacetate is preferred.

Substitution in the procedures of Examples 6 and 7 for the sodium 7 - [D-α-(3-guanyl - 1 - ureido)phenyl-acetamido]cephalosporanate used therein of an equimolar weight of each of the above products produces the corresponding betaine.

ILLUSTRATIVE PREPARATIONS OF STARTING REAGENTS (A) Ring-substituted 2-phenylglycines Substituted DL 2-phenylglycines are prepared by alkaline hydrolysis of the appropriate 5-arylhydantoins which in turn are prepared from substituted benzaldehydes by the method of Bucherer and Leib, J. Prakt. Chem., 141, 5 (1934); for additional examples of this procedure see also U.S. Pat. 3,140,282. The substituted DL 2-phenyl-glycines are resolved, if desired, via their N-formyl derivatives as described by E. Fisher et al., Ber. 41, 1286 (1906) or by one of the procedures illustrated below.

D-α-acetamido-phenylacetic acid.—A suspension of 50 g. (0.331 mole) of D-(—)-2-phenylglycine in 700 ml. of water was cooled to 0 to 5° C. and 13.2 g. (0.331 mole) of sodium hydroxide was added with stirring to produce a solution. Acetic anhydride (67.5 g., 0.662 mole) was added rapidly in one portion to the vigorously stirred solution which was initially cooled to 0 to 5° C. by means of a salt-ice cooling bath. This was immediately followed by the addition of a solution of 39.7 g. (0.993 mole) of sodium hydroxide in 200 ml. of water in a rapid stream from a dropping funnel. The temperature rose to a maximum of about 25° C. The solution was stirred for an additional fifteen minutes in the cooling bath and then acidified with concentrated hydrochloric acid. The precipitated product was collected by filtration, washed on the filter with water and recrystallized from 1:1 95% ethanol-water; yield 46.0 g. (72%), M.P. 186–188° C., $[\alpha]_D^{24°} = -217.9°$ (c.=1%, ethanol).

D - α - acetamido - 4 - nitrophenylacetic acid.—D-α-acetamidophenylacetic acid (20 g., 0.104 mole) was slowly added to 50 ml. of concentrated sulfuric acid with cooling as needed to maintain the temperature at 20 to 25° C. The mixture was stirred for about 20 minutes until most of the solid dissolved. Nitric acid (90%, d.=1.5, 9.7 ml. 0.208 mole) was added dropwise at such a rate to the stirred mixture that the salt-ice bath maintained the temperature in the range of 0 to —5° C. The reaction mixture was stirred at —5 to —10° C. for an additional 30 minutes and then poured onto about 300 g. of ice flakes. The white crystalline product was collected by filtration, washed with water and recrystallized three times from 1:1 95% ethanol-water; M.P. 180–182° C. dec., yield 11.5 g. (46.4%). An additional recrystallization from ethyl acetate did not change the melting point; $[\alpha]_D^{24°} = -206.4°$ (c.=5%, ethanol).

Analysis.—Calc'd for $C_{10}H_{10}N_2O_5$ (percent): C, 50.42; H, 4.23; N, 11.76. Found (percent): C, 50.14; H, 4.07; N, 11.96.

D-α-acetamido-4-aminophenylacetic acid.—A solution of 15 g. (0.063 mole) of D-α-acetamido-4-nitrophenyl-acetic acid in 250 ml. of 95% ethanol was hydrogenated in the presence of 0.6 g. of 5% palladium on carbon on a Paar hydrogenator at an initial pressure of 50 p.s.i. for 64 minutes. The product had crystallized from the hydrogenation mixture. Approximately 200 ml. of water was added, the mixture warmed to dissolve the product and the catalyst removed by filtration. Chilling the filtrate gave 9.9 g. of product, M.P. 192–195° C. dec. The product was recrystallized four times from 1:1 95% ethanol-water, weight 4.8 g., M.P. 207–209° C. dec., $[\alpha]_D^{24°} = -182.2°$ (c.=0.5%, 1 N HCl).

Analysis.—Calc'd for $C_{10}H_{12}N_2O_3$ (percent): C, 57.71; H, 5.81; N, 13.46. Found (percent): C, 57.61, 57.64; H, 5.67; N, 13.18.

D-α-acetamido-4-iodophenylacetic acid.—To a solution of 5.0 g. (0.024 mole) of D-α-acetamido-4-aminophenyl-acetic acid in 70 ml. of trifluoroacetic acid at —5 to 0° was added slowly 1.8 g. of sodium nitrite. The solution was stirred for 25 minutes. Solid potassium iodide (4.8 g., 0.024 mole) was added at 0 to 5°. The temperature of the dark brown mixture was increased to 30° whereupon a vigorous gas evolution occurred. The mixture was maintained at 30° for 45 minutes and then heated at reflux for one-half hour. The trifluoroacetic acid phase was decanted from the dark colored insoluble material. The trifluoroacetic acid was distilled off at reduced pressure. The residue was taken up in 50 ml. of water. After ice cooling there was obtained a precipitate of brown solid. Two recrystallizations from 1:1 95% ethanol-water gave D-α-acetamido-4-iodophenylacetic acid; M.P. 217° dec.

with darkening at 202°, $[\alpha]_D^{24°} = -173.2°$ (c.=0.5, 95% ethanol).

*Analysis.*—Calc'd for $C_{10}H_{10}INO_3$ (percent): C, 37.64; H, 3.16; N, 4.39. Found (percent): C, 37.84; H, 3.30; N, 4.34.

The dark colored insoluble material was slurried with water and treated with 1 M sodium thiosulfate to remove the iodine color. The solid was filtered, washed with water and twice recrystallized from 1:1 95% ethanol-water with a carbon treatment giving additional product: $[\alpha]_D^{24°} = -170.6°$ (c.=0.5, 95% ethanol).

*Analysis.*—Calc'd for $C_{10}H_{10}INO_3$ (percent): C, 37.64; H, 3.16; N. 4.39. Found (percent): C, 37.70; H, 3.25; N, 4.45.

D-α-amino-4-iodophenylacetic acid.—A suspension of 3.7 g. (0.011 mole) of D-α-acetamido-4-iodophenylacetic acid in 15 ml. of 2 N hydrochloric acid plus sufficient dioxane to give a solution at the boiling point was heated at reflux for 1.5 hours. The solvent was distilled off at reduced pressure. The residue was extracted with water, the insoluble material (solid A) being removed by filtration. The filtrate was stripped to dryness at reduced pressure and the solid residue was extracted with water, the insoluble material (solid B) again removed. The filtrate was again evaporated to dryness and the residue extracted with water and the insoluble material (solid C) again removed. The filtrate was stripped to dryness giving solid D as residue. The infrared spectra (KBr) showed solids A and B to be amino acid zwitter ion and solid C to be mostly amino acid hydrochloride.

Solid A was hydrolyzed in 2.5 N hydrochloric acid plus dioxane for 1.75 hours. The solution was evaporated to dryness, the residue taken up in water, a small amount of insoluble material removed by filtration, and the filtrate evaporated to dryness leaving solid E. An infrared spectrum (KBr) showed solid E to be a mixture of amino acid hydrochloride and zwitter ion.

Solids D and E were combined in water and the system adjusted to pH 4.5 giving 1.55 g. of D-α-amino-4-iodophenylacetic acid; M.P. 204–205° dec., $[\alpha]_D^{24°} = -99.4°$ (c.=0.5, 1 N HCl).

*Analysis.*—Calc'd for $C_8H_8INO_2$ (percent): C, 34.68; H, 2.91; N, 5.06. Found (percent): C, 34.63; H, 3.24; N, 4.77.

D-α-amino-4-iodophenylacetic acid.—D-α-acetamidophenylacetic acid (Beil. 14, 591) (200 g., 1.036 mole) was added slowly to a solution of 161.6 g. (0.52 mole) of silver sulfate in 1.2 l. of conc. sulfuric acid with cooling as needed to keep the temperature below 30°. Finely pulverized iodine (684 g., 2.7 mole) was added in portions during 1.5 hours. The mixture was stirred at room temperature for 1.5 hours longer. The mixture was filtered through a sintered glass filter and the filtrate poured into ca. 3 l. of crushed ice. The solid was filtered, washed with water, and air dried. The material was recrystallized from 650 ml. of 2-propanol (the hot solution was filtered to remove some insoluble material) giving solid A; yield 46.6 g., M.P. 175–183° dec. The filtrate was concentrated and stored in the cold overnight giving solid B; yield 132 g., M.P. 160–168°. Solids A and B were crude D-α-acetamido-4-iodophenylacetic acid.

Solid B was combined with 500 ml. of 2 N hydrochloric acid and refluxed for one hour. The insoluble material (solid C) was removed by filtration and washed with water; yield 100 g., M.P. 180–183°.

Solid C was hydrolyzed in 200 ml. of 2 N hydrochloric acid plus enough dioxane to solubilize the material. After 2.25 hours at reflux the solvent was distilled off at reduced pressure and the residue extracted with 250 ml. of water. The insoluble material (solid D) was removed by filtration. The filtrate was adjusted to pH 4.5 and after cooling in an ice bath the precipitate was filtered, washed with water, and triturated with boiling 95% ethanol giving 10.8 g. of D-α-amino-4-iodophenylacetic acid.

Solid A was hydrolyzed in 2 N hydrochloric acid plus dioxane for two hours and the solvent distilled off at reduced pressure. The residue was extracted with water. The insoluble material (solid F) was removed by filtration. The filtrate was adjusted to pH 4.5 giving crystalline D-α-amino-4-iodophenylacetic acid; yield 14.4 g., $[\alpha]_D^{24°} = -86.2°$ (c.=0.5, 1 N HCl).

Solids D and F were combined and suspended in 350 ml. of water. The suspension was adjusted to pH 4.5 with 20% sodium hydroxide. The solid was filtered, washed with water, air dried, and triturated with 300 ml. of boiling 95% ethanol giving 42.5 g. of D-α-amino-4-iodophenylacetic acid; $[\alpha]_D^{24°} = -99.8°$ (c.=0.5, 1 N HCl).

D-α-amino-4-iodophenylacetyl chloride hydrochloride.—A suspension of 42.3 g. (0.15 mole) of finely ground D-α-amino-4-iodophenylacetic acid in 1.5 l. of methylene chloride was gassed at 0 to 5° with anhydrous hydrogen chloride and 40.6 g. (0.195 mole) of phosphorus pentachloride added. The mixture was stirred for two hours at 5°. Skellysolve B (800 ml.) was added to the reaction mixture and the product collected by filtration. The product was washed with Skellysolve B and dried in vacuo; yield 40.9 g. (82%).

D-α-acetamido-3-iodophenylacetic acid.—To a solution of 50.0 g. (0.24 mole) of D-α-acetamido-3-aminophenylacetic acid in 550 ml. of trifluoroacetic acid at —5° was added 17.0 g. of 97% sodium nitrite gradually during 10 minutes. The solution was stirred at —5° for 25 minutes longer. The diazonium salt solution was added in a steady stream to a vigorously stirred suspension of 79.0 g. of potassium iodide and 2.5 g. of iodine in 300 ml. of trifluoroacetic acid initially at 23°. During the addition the temperature rose to 25–27° and steady gas evolution was noted. The mixture was stirred for 3.5 hours at room temperature until the gas evolution ceased. The reaction mixture was filtered leaving a quantity of dark gummy solid. The filtrate was concentrated to a small volume, water added, and further concentrated. The concentrate containing a solid was treated with dilute sodium thiosulfate and the solid collected by filtration. Recystallization from 4:1 water —95% ethanol gave 19.5 g. of D-α-acetamido-3-iodophenylacetic acid; M.P. 181–181.5°, $$[\alpha]_D^{24·} = -158.0°$$

(c.=0.5, 95% ethanol).

*Analysis.*—Calc'd for $C_{10}H_{10}INO_3$ (percent): C, 37.64; H, 3.16; N, 4.39. I, 39.77. Found (percent): C, 37.80; H, 3.07; N, 4.55; I, 39.20.

D-α-amino-3-iodophenylacetic acid.—D-α-acetamido-3-iodophenylacetic acid (10.0 g.) in 45 ml. of 2 N hydrochloric acid plus sufficient dioxane to give a solution at the boiling point was refluxed for 2.25 hours. The solvent was evaporated to dryness and the residue extracted with water. The insoluble material (solid A) was removed by filtration. The filtrate was evaporated to dryness and the residue in water was adjusted to pH 4.5 with sodium hydroxide giving 1.0 g. of D-α-amino-3-iodophenylacetic acid; M.P. 192–195°, $[\alpha]_D^{24°} = -81°$ (c.=0.5, 1 N HCl).

The filtrate deposited a second crop of amino acid on storage in the cold; yield 0.6 g., M.P. 203–204.5°, $[\alpha]_D^{24°} = -101.4°$ (c.=0.5, 1 N HCl).

Solid A (which was chiefly amide) was hydrolyzed with 45 ml. 2 N hydrochloric acid plus dioxane for two hours at reflux. The residue remaining after evaporation of the solvent was combined with water and again evaporated to dryness. The residue in water was adjusted to pH 4.5 giving 1.9 g. of D-α-amino-3-iodophenylacetic acid; M.P. 196–199°, $[\alpha]_D^{24°} = -95°$ (c.=0.5, 1 N HCl).

The infrared and nuclear magnetic resonance spectra of the three fractions were consistent with the desired product.

D-α-amino-3-iodophenylacetyl chloride hydrochloride.—A suspension of 2.5 g. (0.009 mole) of D-α-amino-3-iodophenylacetic acid in 100 ml. of methylene chloride at 0 to 5° was gassed with anhydrous hydrogen chloride and 2.5 g. (0.012 mole) of phosphorus pentachloride added.

After stirring for 24 hours at 0 to 5° an additional 1.2 g. of phosphorus pentachloride was added and stirring continued for a total of 38 hours. The reaction mixture was diluted with Skellysolve B, the product filtered, washed with Skellysolve B, and dried in vacuo; yield 1.2 g.

D-(−)-α-amino-α-(3-chloro - 4 - hydroxyphenyl)glycine.—To a stirred suspension of 5.01 g. (0.03 mole) of D-(−)-2-(p-hydroxyphenyl)glycine in 100 ml. of glacial acetic acid was bubbled in HCl gas at a vigorous rate for about 5 minutes. At first a clear solution resulted and then the hydrochloride salt crystallized out. Next, 4.45 g. (0.033 mole) of sulfuryl chloride (freshly distilled) in 25 ml. of glacial acetic acid was added, with stirring, over a 30 minute period, dropwise. The temperature was 26°–27° C. throughout the addition. After one hour stirring, 250 ml. of dry ether was added slowly and crystallization began. After 15 min. the product was filtered off, washed with dry ether and air dried. The 7 g. obtained was dissolved in 50 ml. of 1 N HCl, filtered, and the pH adjusted, with cooling to 5 with conc. NH$_4$OH. The resulting crystalline product was filtered off after 5 min. standing, washed with two 20 ml. portions of water and 5× with acetone. The vacuum dried material weighed 4.6 g.; dec. pt. 217° C. (sharp). The NMR and IR spectra were consistent with the desired structure $[\alpha]_D^{22}$ ° C.—137.1° (c.=1%, 1 N HCl)

Analysis.—Calc'd for $C_8H_8ClNO_3$ (percent): C, 47.76; H, 4.01; Cl, 17.66. Found (percent). C, 47.16; H, 3.92; Cl, 17.96.

Dl-2-(p-methoxyphenyl) - glycine.—To a stirred solution of 19.6 g. (0.4 mole) of NaCN in 80 ml. of H$_2$O was added 23.6 g. (0.450 mole) of NH$_4$Cl and 20 ml. of conc. NH$_4$OH followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of H$_2$O and then 240 ml. of 6 N HCl added with good mixing and the MIBK was removed in vacuo. The resulting slurry was heated at reflux (now in solution) for two hours. One hundred ml. of H$_2$O was added to the hot solution and then 8 g. of decolorizing carbon added and after ten minutes at gentle reflux the carbon was filtered off and washed with 50 ml. of hot water. The combined filtrates (hot) were stirred and treated with conc. NH$_4$OH until pH 5–6 was obtained (pH paper). The slurry was then cooled to 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6 N HCl with cooling. After one hour the product was filtered off, washed with 3×100 ml. H$_2$O and air dried. Yield 40 g.; dec. 244° C. with sublimation at 230° C.

dl-2-(p-methoxyphenyl) - N - (chloroacetyl) glycine.—To a stirred suspension of 36 g. (0.2 mole) of dl-2-(p-methoxyphenyl)-glycine in 500 ml. of H$_2$O was added 8 g. (0.2 mole of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of H$_2$O was added over a 10 to 15 minute period. More 20% NaOH was added as needed to keep the pH at about 9 for a 1.5 hour period. Next, the pH was adjusted to 2 with 40% H$_3$PO$_4$. The product crystallized immediately and was filtered off, washed with water and recrystallized from ethanol-water to give 38 g. of product melting at 182°–183° C.

Analysis.—Calc'd for $C_{11}H_{12}ClNO_4$ (percent): C, 51.21; H, 4.69. Found (percent): C, 51.49; H, 4.90.

D-(−)-2-(p-methoxyphenyl) - N - chloroacetylglycine and L-(+)-2-(p-methoxyphenyl)-glycine.—To 800 ml. of H$_2$O stirred at 37° C. was added 38 g. (0.148 mole) of dl-2-(p-methoxyphenyl) - N - chloroacetylglycine and NH$_4$OH added dropwise until pH 7.8 was obtained. To the resulting solution was added 2 g. of hog kidney acylase (Sigma Chemical Company) and stirring continued at 37° C. (internal) for 21 hours. The solids containing crude L-(+)-2-(p-methoxyphenyl)-glycine were then filtered off and washed with 2× 100 ml. H$_2$O and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% H$_3$PO$_4$. After one hour cooling at 0° C. the crystalline product was filtered off and washed with cold water (3×) and air dried. The yield was 16 g. D-(−)-2-(p-methoxyphenyl)-N-chloroacetylglycine and when a second run using 5× the above amounts were used a yield of 83 g. (87% yield) was obtained. M.P. 170°–171° C.; $[\alpha]_D^{25}$ ° C. —193° (c.=1%, ethanol).

Analysis.—Calc'd for $C_{11}H_{12}ClNO_4$ (percent): C, 51.21; H, 4.69. Found (percent): C, 51.50; H, 4.99.

When the solids containing crude L-(+)-2-(p-methoxyphenyl)-glycine are treated with hot 3 N HCl (200 ml.) and carbon followed by filtration and pH adjustment to 5.5 there is obtained 6 g. (first run) of pure L-(+)-2-(p-methoxyphenyl)glycine, $[\alpha]_D^{25}$ ° C. +150.4° (c.=1%, 1NHCl).

D-(−)-2-(p-methoxyphenyl)-glycine.—The 16 g. of D-(−)-2-(p - methoxyphenyl) - N - chloroacetylglycine was refluxed 1.5 hours in 170 ml. of 2 N HCl. The resulting clear solution was filtered and cooled at 5° C. and the pH adjusted to 5.5 with NH$_4$OH. The product was then filtered off after cooling 30 min. and washed with 3× 25 ml. of cold water. The dried material D-(−)-2-(p-methoxyphenyl)-glycine weighed 9.5 g. A second run gave 54 g.

$[\alpha]_D^{25}$ ° C. —149.9° (c.=1%, 1 N HCl) (first run)
$[\alpha]_D^{25}$ ° C. —148.1° (c.=1%, 1 N HCl) (second run)

Analysis.—Calc'd for $C_9H_{11}NO_3$ (percent): C, 59.67; H, 6.13; N, 7.74. Found (percent): C, 59.38; H, 6.16; N, 8.00.

D-(−)-2-(p-hydroxyphenyl)-glycine.—A mixture of 1.81 g. (0.01 mole) of D-(−)-2-(p-methoxyphenyl) glycine ($[\alpha]_D^{25}$ ° C. —149.9°, c.=1%, 1 N HCl) and 10 ml. of 48% HBr was heated at gentle reflux for 2 hours. The resulting solution was concentrated at reduced pressure at 30° C. to a wet solid. A minimum amount of water (20° C.) was added to dissolve the HBr salt and with cooling NH$_4$OH was added to pH 5. The resulting thick gel which ppt. was warmed to 50° C. and when solution was nearly obtained a different crystalline form began to ppt. Upon cooling 30 min. at 0°–5° C. there was obtained 990 mg. of cold water washed (3× 1 ml.) and air dried material, D-(−)-2-(p-hydroxyphenyl)glycine. $[\alpha]_D^{25}$ ° C. —161.2° (c.=1%, 1 N HCl) dec. pt. 223° C. A second run using 20× the above amounts gave 24.5 g. of material. $[\alpha]_D^{25}$ ° C. —153° (c.=1%, 1 N HCl).

Analysis.—Calc'd for $C_8H_9NO_3$ (percent): C, 57.49; H, 5.43; N, 8.39. Found (percent): C, 57.41; H, 5.67; N, 8.39.

D-(−)-2-(3,5-dichloro - 4 - hydroxyphenyl)-glycine.—To a stirred suspension of 5.01 g. (0.03 mole) of D-(−)-2-(4-hydroxyphenyl)glycine in 100 ml. of glacial acetic acid was bubbled in HCl gas at a vigorous rate for about 5 minutes. At first a clear solution resulted and then the hydrochloride salt crystallized out. Next, 9.0 g. (0.067 mole) of sulfuryl chloride (freshly distilled) in 25 ml. of glacial acetic acid was added, with stirring, over a 30 minute period, dropwise. The temperature was 26°–27° C. throughout the addition. After the sulfuryl chloride addition, the slurry was heated to 70° C. for 30 minutes and then stirred at ambient temperature for two hours. Then 250 ml. of dry ether was added slowly and crystallization began. After 15 min. the product was filtered off, washed with dry ether and air dried. The 7 g. obtained was dissolved in 100 ml. of 1 N HCl, filtered, and the pH adjusted, with cooling to 5 with conc. NH$_4$OH. The resulting crystalline product was filtered off after 5 min. standing, washed with two 20 ml. portions of water and 5× with acetone. The vacuum dried material weighed 4.5 g.; dec. pt. 210° C. (sharp). The NMR and IR spectra were consistent with the desired structure. $[\alpha]_D^{25}$ ° C. −126.3° (c.=1%, 1 N HCl).

Analysis.—Cal'd for C$_8$H$_7$Cl$_2$NO$_3$ (percent): C, 40.78; H, 2.99; Cl, 30.04. Found (percent): C, 41.85; H, 3.22; Cl, 27.80.

Resolution of DL - α - amino - 3 - methoxyphenylacetic acid.—DL-α-amino - 3 - methoxyphenylacetic acid [A. H. Neims, D. C. DeLuca, L. Hellerman, Biochemistry, 5 (1), 203 (1966)] was resolved with d-10-camphorsulfonic acid in water.

DL - α - amino-3-methoxyphenylacetic acid (33.1 g., 0.182 mole) was added to a solution of 46.4 g. (0.2 mole) of d-10-camphorsulfonic acid in 135 ml. of water at 50 to 60°. The solution was filtered and stored in the cold for 20 hours. The precipitated amino acid d-10-camphorsulfonate salt was collected by filtration. The salt was repeatedly recrystallized from water until a sample of the amino acid regenerated from it showed no further change in optical rotation. Thus, after three recrystallizations from water, there was obtained 3.7 g. of the d-10-camphorsulfonate salt of D-α-amino-3-methoxyphenylacetic acid; M.P. 184–185° dec. The salt (1.4 g.) was dissolved in about 10 ml. of water by warming. The solution was adjusted to pH 5–6 with concentrated ammonium hydroxide. The product was allowed to crystallize first at room temperature and then in an ice bath giving, after filtration and drying in vacuo over phosphorus pentoxide, 0.36 g. of D-α-amino-3-methoxyphenylacetic acid; M.P. 178–181° dec., $[\alpha]_D^{24°}$=−129.0° (c.=0.5, 1N HCl). A portion of the amino acid was recrystallized from water and dried in vacuo over phosphorus pentoxide; M.P. 180–182° dec., $[\alpha]_D^{24°}$=−136° (c.=0.08, 1 N HCl).

Analysis.—Calc'd for C$_9$H$_{11}$NO$_3$·⅓ H$_2$O (percent): C, 57.74; H, 6.28; N, 7.48. Found (percent): C, 57.70; 57.76; H, 6.23; 6.18; N, 7.21.

D-α-amino - 3 - hydroxyphenylacetic acid hyrobromide monohydrate.—D - α - amino-3-methoxyphenylacetic acid (2.9 g., 0.016 mole) and 16 ml. of 48% hydrobromic acid were refluxed for two hours. The volatile materials were removed at reduced pressure. Water (about 15 ml.) was added to the residue and this removed at reduced pressure. This was repeated once. The residue was dried in vacuo to remove all water. The dried residue was recrystallized by dissolving in 2-propanol and adding Skellysolve B to the cloud point. After drying there was obtained 3.0 g. of D-α-amino-3-hydroxyphenylacetic acid hydrobromide monohydrate; M.P. 156–162° dec., $[\alpha]_D^{24°}$=−62° (c.=0.1, water). The infrared and nuclear magnetic resonance spectra were consistent with the desired product.

Analysis.—Calc'd for C$_8$H$_9$NO$_3$·HBr·H$_2$O (percent): C, 36.10; H, 4.55; N, 5.26. Found (percent): C, 37.03; H, 5.12; N, 5.34.

(2) D-α-acetamido-3-nitrophenylacetic acid.—A stirred suspension of 49.8 g. (0.254 mole) of D-α-amino-3-nitrophenylacetic acid [P. Fries, K. Kjaer, Acta Chimica Scand., 17, 2391 (1963)] in 500 ml. of water was cooled in an ice bath and a solution of 8.36 g. (0.209 mole) of NaOH in 40 ml. of water was added causing most of the solid to dissolve. There was immediately added 42.7 g. (0.418 mole) of acetic anhydride followed by the addition as needed of a solution of 25.1 g. (0.627 mole) of sodium hydroxide to maintain the pH value at about 7. The reaction mixture was stirred in the ice bath for an additional 15 minutes, filtered, and adjusted to pH 1.8 with concentrated hydrochloric acid. The crystalline product was collected by filtration and washed with water; yield 25 g., M.P. 172–174° dec. The product was twice recrystallized from 1:1 95% ethanol-water giving, after drying in vacuo over phosphorus pentoxide, 11.8 g. of D-α-acetamido-3-nitrophenylacetic acid, M.P. 183–185°; $[\alpha]_D^{24°}$=−179.4° (c.=0.5, 95% ethanol). The infrared and nuclear magnetic resonance spectra were consistent with the desired compound.

Analysis.—Calc'd for C$_{10}$H$_{10}$N$_2$O$_5$ (percent): C, 50.42; H, 4.23; N, 11.76. Found (percent): C, 50.56; H, 4.20; N, 11.73.

D-α-acetamido-3-aminophenylacetic acid.—A solution of 9 g. (0.0378 mole) of D-α-acetamido-3-nitrophenylacetic acid in 150 ml. of methanol was hydrogenated using 0.6 g. of 5% palladium on carbon at an initial pressure of 50 p.s.i. on a Paar hydrogenation apparatus for 30 minutes. The hydrogenation bottle was cooled with a jet of air to keep the temperature under 40°. The catalyst was removed by filtration. Evaporation of the filtrate gave a crystalline product. Two recrystallizations from 1-propanol gave 3.4 g. of D-α-acetamido-3-aminophenylacetic acid, M.P. 200–201° dec.; $[\alpha]_D^{24°}$=−174.4° (c.=0.5 water).

Analysis.—Calc'd for C$_{10}$H$_{12}$N$_2$O$_3$ (percent): C, 57.71; H, 5.81; N, 13.46. Found (percent): C, 57.78; H, 5.97; N, 13.35.

D-α-amino-3-hydroxyphenylacetic acid.—A solution of 2.1 g. (0.01 mole) of D-α-acetamido-3-aminophenylacetic acid in 35 ml. of trifluoroacetic acid was cooled to −5° and 0.69 g. (0.01 mole) of solid sodium nitrite added. After stirring for 20 minutes at −5° acetic acid (5 ml.) was added. The mixture was stirred at 45 to 50° for one and one-half hours and then heated on the steam bath for one-half hour. The cold reaction mixture was poured onto 30 g. of crushed ice. The volatile materials were distilled at reduced pressure leaving as residue a slightly brown viscous oil. The residue was combined with 30 ml. of 2 N hydrochloric acid and refluxed for one and one-half hours. The volatile materials were removed under reduced pressure. Water was added to the residue and this removed under reduced pressure causing the hydrochloride salt of the product to crystallize. The residue was dissolved in a minimum amount of water, adjusted to pH 4.5 with 20% sodium hydroxide, filtered, and stored in the cold giving 0.43 g. of crystalline D-α-amino-3-hydroxyphenylacetic acid, M.P. 204–206° dec. The filtrate was stripped to dryness and a small amount of water added to the crystalline residue giving a 2nd crop (0.46 g.) of the amino acid.

The filtrate from the 2nd crop plus 3 ml. of concentrated hydrochloric acid were concentrated to dryness. The residue was dissolved in a small amount of water by warming, cooling gave crystalline D-α-amino-3-hydroxyphenylacetic acid hydrochloride monohydrate; yield 0.5 g., M.P. 150–153° dec., $[\alpha]_D^{24°}$=−91.2°. (c.=0.5, water). The infrared and nuclear magnetic resonance spectra were consistent with the desired product.

Analysis.—Calc'd for C$_8$H$_9$NO$_3$·HCl·H$_2$O (percent): C, 43.35; H, 5.46; N, 6.32. Found (percent): C, 42.7; H, 5.6; N, 6.17; residue, 1.45. Values corrected for 1.45% residue: C, 43.3; H, 5.7; N, 6.26.

The two crops of D-α-amino-3-hydroxyphenylacetic acid were combined, suspended in a small amount of water, 2 ml. of 48% hydrobromic acid added and the filtered solution evaporated to dryness. The residue was twice recrystallized from water giving 150 mg. of D-α-amino-3-hydroxyphenylacetic acid hydrobromide monohydrate; M.P. 172–175° dec., $[\alpha]_D^{24°}$=−74° (c.=0.1, water). The infrared and nuclear magnetic resonance spectra were consistent with the assigned structure.

Analysis.—Calc'd for C$_8$H$_9$NO$_3$·HBr·H$_2$O (percent): C, 36.10; H, 4.55; N, 5.26. Found (percent): C, 36.20; H, 4.62; N, 5.32.

(3) D-α-amino-3-hydroxyphenylacetic acid.—A solution of 38.4 g. (0.1845 mole) of D-α-acetamido-3-aminophenylacetic acid in 600 ml. of trifluoroacetic acid prepared at 15 to 20° was cooled to 5° and 13 g. (0.1845 mole) of 98% sodium nitrite added in portions during a 10-minute period with stirring at −5°. After stirring for an additional 25 minutes 90 ml. of acetic acid was added at −5 to 0°. The mixture was heated at 45 to 50° for one and one-half hours (gas evolution), refluxed for one-half hour, cooled, and poured onto 500 g. of ice flakes. The volatile materials were removed at reduced pressure. The residue was refluxed with 400 ml. of 2 N hydrochloric acid for one hour. Concentration to a small volume gave the crystalline hydrochloride salt. The dried product (27 g.) was recrystallized from wet acetic acid (150 ml. acetic acid plus 7 ml. of water) giving 21 g. of D - α - amino-3-hydroxyphenylacetic acid hydrochloride monohydrate; M.P. 149–152° dec., $[\alpha]_D^{24°} = -103.0°$ (c.=0.5, water).

D-α-amino-4-acetamidophenylacetic acid.—D - α - acetamido-4-aminophenylacetic acid (39.2 g., 0.188 mole) in 400 ml. of 2 N hydrochloric acid was refluxed for 2 hours. The mixture was concentrated to dryness at reduced pressure. Water was added and the solution again concentrated to dryness. This was repeated once. The crystalline residue was slurried with 2-propanol, filtered, and washed additionally with 2-propanol giving, after air drying, 47 g. of the hydrochloride of D-α-amino-4-amino-phenylacetic acid.

Ten g. of the hydrochloride in 40 ml. of water was adjusted to pH 4.8 with 20% sodium hydroxide. Crystalline D-α-amino-4-aminophenylacetic acid separated. To the solution obtained by adding 160 ml. additional of water was added 10 ml. of thioacetic acid. The mixture was stirred for 17 hours at 24° under a nitrogen atmosphere. The reaction mixture, containing a quantity of crystalline product, was concentrated to one-half of its initial volume giving 4.5 g. of product. The crude product was suspended in water, the suspension adjusted to pH 4.6 with 20% NaOH, heated to 95°, carbon treated, and the product allowed to crystallize in the cold overnight. The resulting gelatinous mass was broken up by warming. The solid was removed by filtration; wt. 0.2 g., M.P. 203–206° dec. The filtrate was diluted with an equal volume of 95% ethanol giving 1.4 g. of D-α-amino-4-acetamidophenylacetic acid; M.P. 214–215° dec. $[\alpha]_D^{24°} = -133.4°$ (c.=0.5, 1 N HCl).

Analysis.—Calc'd for $C_{10}H_{12}N_2O_3$ (percent): C, 57.71; H, 5.814; N, 13.46. Found (percent): C, 56.80, 56.72; H, 5.84, 5.89; N, 13.62; H₂O, 1.32. Found values corrected for 1.32% water: C, 57.52; H, 5.71; N, 13.80.

D-α-amino-3-aminophenylacetic acid.—A solution of 9.8 g. (0.05 mole) of D-α-amino-3-nitrophenylacetic acid [P. Friis and A. Kjaer, Acta Chimica Scand. 17, 2391 (1963); British patent specification, 1,033,257] in 200 ml. of water was prepared by adjusting the mixture to pH 9.3 with concentrated ammonium hydroxide. The solution was hydrogenated for 1 hour in the presence of 0.4 g. of 5% palladium on carbon on a Paar hydrogenation apparatus at an initial pressure of 50 p.s.i. The vessel was cooled as needed to keep the temperature from going above 30°. After 1 hour an additional 0.4 g. of catalyst was added and hydrogenation continued for 1 hour longer. Three additional runs were made hydrogenating a total of 39.4 g. of nitro compound. Addition of the second amount of catalyst was omitted in the additional runs and a hydrogenation time of about 1 hour was used. Each run was filtered to remove catalyst, the filtrates pooled and concentrated to a small volume until crystallization of the product started. The concentrate was diluted with about five volumes of 95% ethanol, the mixture stored overnight in the cold and the product filtered and washed further by slurrying with 95% ethanol. After drying in a vacuum oven for 3 hours at 40° and then in vacuo over phosphorus pentoxide for 64 hours there was obtained 25.7 g. of D-α-amino-3-aminophenylacetic acid; M.P. 188–191°, $[\alpha]_D^{24°} = -139.0$ (c.=1 in HCl).

The preparation of this compound has been described by P. Friis and A. Kjaer, Acta Chimica Scand. 17, 2391 (1963).

D-α-amino-3-acetamidophenylacetic acid.—A mixture of 5 g. (0.0301 mole) of D-α-amino-3-aminophenylacetic acid and 5 ml. of thioacetic acid in 100 ml. of water was stirred for 16 hours under a nitrogen atmosphere. The mixture was heated on a steam bath for one-half hour and then concentrated at reduced pressure to a small volume. On cooling the concentrate, the product started to crystallize. The concentrate was diluted with 95% ethanol and, after chilling in an ice bath, the product was filtered and washed with 95% ethanol; wt. 1.8 g. The filtrate was further diluted with 95% ethanol giving an additional 2.3 g. of product. The two crops of product were combined, dissolved in a small amount of water by warming, the solution concentrated slightly and diluted with a large volume of 95% ethanol. The initial crop of solid was removed by filtration and the filtrate stored in the cold for 16 hours giving, after drying at 65° for 3 hours in vacuo over phosphorus pentoxide, 0.90 g. of product, M.P. 185–187° dec. The product was twice recrystallized from 1:1 95% ethanol-water; wt. 0.36 g., M.P. 186–187° dec. $[\alpha]_D^{24°} = -120°$ (c.=0.5, 1 N HCl).

Analysis.—Calc'd for $C_{10}H_{12}N_2O_3$ (percent): C, 57.7; H, 5.81; N, 13.5. Found (percent): C, 47.29; H, 6.79; N, 11.21; H₂O, 18.3. Found values corrected for 18.3% water: C, 57.9; H, 5.83; N, 13.7.

DL-α-amino-3-chlorophenylacetic acid.—A solution of 250 g. of m-chlorobenzaldehyde in 1.5 l. of 95% ethanol was added in one portion to a stirred solution of 123 g. of sodium cyanide, 515 g. of ammonium carbonate and 1.5 l. of water. The mixture was stirred at 50° for 120 hours. The cooled reaction mixture was acidified to pH 2 with concentrated hydrochloric acid and stirred one hour. The hydantoin was collected by filtration, washed with cold water, and sucked dry on the filter.

A mixture of the crude hydantoin obtained from two runs and 4.1 of 10% sodium hydroxide was refluxed for 18 hours. The solution was carbon treated and neutralized to pH 7 with acetic acid. The solid was collected by filtration, washed with water, and dried on the filter. A suspension of the product in 4 l. of water was acidified to pH 2 with concentrated hydrochloric acid. After stirring for 1.5 hours the insoluble material was removed by filtration and the filtrate adjusted to pH 7 with 10% sodium hydroxide. The precipitate was collected by filtration and dried in vacuo at 75° for 18 hours giving 311 g. of DL-α-amino-3-chlorophenylacetic acid; M.P. 266–269° dec.

DL-α-formamido-3-chlorophenylacetic acid.—To 100 g. of DL-α-amino-3-chlorophenylacetic acid was added 1.33 l. of formic acid. The reaction mixture was warmed to 50° and 483 ml. of acetic anhydride was added dropwise. After storage overnight the DL-α-formamido-3-chlorophenylacetic acid was collected by filtration and washed with water; yield 97 g.

D - (−) - α - amino - 3-chlorophenylacetic acid.—α-Formamido-3-chlorophenylacetic acid (721 g.) and one kg. of dehydroabietylamine were combined in 4.1 of methanol. After storing in the cold for two hours the crystalline salt was collected by filtration. The product was recrystallized from methanol-water; yield 598 g., $[\alpha]_D^{25°} = -225°$ (c.=0.4, methanol). The salt was slurried in 2 l. of methanol and 2 liters of saturated sodium bicarbonate solution. The mixture was diluted with 2 l. of water, layered with methyl isobutyl ketone, and stirred vigorously. The aqueous phase was separated and acidified to pH 2 with conc. hydrochloric acid. The acid was collected by filtration and dried. The dried product was combined with 2 l. of 6 N hydrochloric acid and 750 ml. of methanol, the mixture heated for two hours, and filtered. The solution was adjusted to pH 5 with ammonium hydroxide. The solid was collected by filtration and washed with water and acetone giving 112 g. of D-(—)-α-amino-3-chlorophenylacetic acid; $[\alpha]_D^{23°}=125°$ (c.=0.4, 1 N HCl).

D-(—)-α-amino-3-chlorophenylacetyl chloride hydrochloride.—To a stirred suspension of 25 g. of D-(—)-α-amino-3-chlorophenylacetic acid in 375 ml. of methylene chloride at 2° was added 36.5 g. of phosphorus pentachloride. After stirring at 0 to 2° for one and one-half hours the product D-(—)-α-amino-3-chlorophenylacetyl chloride hydrochloride was collected by filtration, washed with methylene chloride and "Skellysolve B," and dried in vacuo to constant weight; yield 17.0 g.

DL-α-amino-3-fluorophenylacetic acid.—To a stirred solution of 24.5 g. of sodium cyanide, 29.5 g. of ammonium chloride, 25 ml. of ammonium hydroxide and 100 ml. of water at room temperature was added a solution of 62.0 g. of m-fluoro-benzaldehyde in 200 ml. of methanol. The mixture was stirred at 38° for two hours. The methanol was stripped off at reduced pressure. The residue was extracted with two by 200-ml. portions of ethyl acetate. The combined extracts were washed with water. To the ethyl acetate phase was added dropwise with vigorous stirring 50 ml. of 6 N hydrochloric acid at room temperature. The solution was put under vacuum (water aspirator) and 250 ml. of 6 N hydrochloric acid added dropwise. The mixture was refluxed for 2.5 hours, stirred for 13 hours, and adjusted to pH 4.8 with concentrated ammonium hydroxide while cooling in an ice bath. The aqueous phase was decanted and the gummy precipitate triturated with water and ethyl acetate. The product DL-α-amino-3-fluorophenylacetic acid was collected by filtration and dried in vacuo over phosphorus pentoxide; yield 8.6 g., M.P. 200-203° (sublimation). A second crop of product separated from the filtrates; yield 2.0 g., M.P. 245-250° (sublimation).

DL-α-formamido-3-fluorophenylacetic acid.—A partial solution of 35 g. of DL-α-amino-3-fluorophenylacetic acid in 356 ml. of 88% formic acid was heated to 50° and 119 ml. of acetic anhydride added dropwise. The mixture was stirred for 17 hours at 50-60° and cooled. The product, DL-α-formamido-3-fluorophenylacetic acid, was collected by filtration and dried in vacuo; yield 38.5 g., M.P. 207-209° dec.

D-α-formamido-3-fluorophenylacetic acid.—To a solution of 20 g. of DL-α-formamido-3-fluorophenylacetic acid in 4 l. of pH 7 phosphate buffer was added 3.0 g. of hog kidney D-amino acid oxidase (Nutritional Biochemicals Corp.). The mixture was stored at 37° for 19.5 hours, adjusted to pH 5.0 with acetic acid, 5 g. of carbon added, heated to 60° for one-half hour, and filtered. The filtrate was adjusted to pH 2 with 40% phosphoric acid and extracted with ethyl acetate. The ethyl acetate extract was washed with water and stripped to dryness giving 10.0 g. of product; M.P. 190-192°, $[\alpha]_D^{24°}=-161.0°$ (c.=1.0, methanol). The product was again treated with hog kidney D-amino acid oxidase (1 g.) in 500 ml. of pH 7 phosphate buffer and the product worked up as above. There was obtained after recrystallization of the product from methanol 5.7 g. of D-α-formamido-3-fluorophenylacetic acid; $[\alpha]_D^{24°}=-178.0°$ (c.=1.0, methanol).

D-α-amino-3-fluorophenylacetic acid.—A suspension of D-α-formamido-3-fluorophenylacetic acid (9.48 g.) in 100 ml. of 6 N hydrochloric acid was refluxed for one-half hour. The reaction mixture was cooled in an ice bath, filtered, and adjusted to pH 3.8 with concentrated ammonium hydroxide. After stirring for 10 minutes the product, D-α-amino-3-fluorophenyl-acetic acid, was collected by filtration and dried in vacuo over phosphorus pentoxide; yield 6.63 g., $[\alpha]_D^{24°}=-110°$ (c.=1.0, 1 N hydrochloric acid), M.P. 249-250°.

(B) Ring-substituted cephaloglycins

D-(—)-α-(3-chloro-4-hydroxyphenyl)-α-(t-butoxycarbonylamino)acetic acid.—To a stirred suspension of 4.0 g. (0.02 mole) of D-(—)-2-(3-chloro-4-hydroxyphenyl)glycine (finely ground) and 1.6 g. (0.04) mole of powdered magnesium oxide in 50 ml. of 1:1 dioxane-water was added 5.8 g. (0.04 mole) of t-butoxycarbonylazide (Aldrich Chemical Company Inc.) over a 30 minute period and then stirring continued for 20 hours at 45°-50° C. The resulting turbid solution was then poured into one liter of ice water with stirring. One 600 ml. ethyl acetate extract was taken and this was washed twice with 200 ml. portions of 5% sodium bicarbonate and these aqueous solutions combined and filtered. Next, with cooling, they were acidified to pH 3 with 40% phosphoric acid under a layer of 500 ml. of ethyl acetate. This ethyl acetate extract was separated and combined with two more 100 ml. ethyl acetate extracts and dried over sodium sulfate. The ethyl acetate solution was then filtered and concentrated under reduced pressure to an oil and 100 ml .of warm benzene added. The resulting solution was filtered. After removing the solvent in vacuo there was obtained 6 g. of an amorphous froth D-(—)-α-(3-chloro-4-hydroxyphenyl - α - (t-butoxycarbonylamino) - acetic acid. Infrared and NMR analysis revealed only the $NH_2$ group had reacted with the azide.

7 - [D-α-(t-butoxycarbonylamino)-α-(3 - chloro-4-hydroxyphenyl) - acetamido]cephalosporanic acid.—To a stirred solution of 4.03 g. (0.02 mole) of D-(—)-α-(3-chloro-4-hydroxylphenyl) - α - (t-butoxycarbonylamino)-acetic acid, 2.8 ml. of triethylamine (0.02 mole) in 100 ml. of tetrahydrofuran, was added 3.64 g. (0.02 mole) of trichloroacetyl chloride in 25 ml. of tetrahydrofuran over a 10 min. period at —40° C. (internal). After an additional 10 min. at —40° C., a pre-cooled solution at —50° C. of 5.44 g. (0.02 mole) of 7–ACA, 5.6 ml. (0.04 mole) of triethylamine in 300 ml. of $CH_2Cl_2$ was added all at once. The temperature was maintained at —40° C. to —30° C. for 30 min. and then the cooling bath was removed and after another 30 min. (T max. 0° C.) the solvent was removed in vacuo at 20° C. The residue was taken up in 150 ml. of $H_2O$ and 150 ml. of ether. The ether layer was discarded and the aqueous layered with 150 ml. of ethyl acetate and then cooled and stirred while being acidified to pH 2.5. The ethyl acetate extract was washed with water, dried 10 min. over $Na_2SO_4$, filtered and conc. to an oil at 20° C. under reduced pressure. The oil was triturated until a solid ppt. with two 200 ml. portions of 1:1 by volume dry ether—"Skellysolve B" (pet. ether). The solids were filtered off and vacuum dried over $P_2O_5$. The yield was 7.4 g. dec. pt. 100° C., slowly. The IR and NMR were consistent with the desired structure.

Analysis.—Calcd. for $C_{23}H_{26}ClN_3O_9S$ (percent): C, 49.64; H, 4.71. Found (percent): C, 49.50; H, 5.48.

7-[D-α-amino - α - (3-chloro - 4 - hydroxyphenyl)-acetamido]-cephalosporanic acid.—A solution of 7 g. of 7-[D - α - (t-butoxycarbonylamino) - α - (3-chloro-4-hydroxyphenyl)-acetamido]-cephalosporanic acid in 200 ml. of 50% aqueous formic acid was stirred and heated at 40° C. for 3 hours and then the solvents removed in vacuo at 20° C. to leave a glass-like residue. This was further dried by adding 200 ml. of toluene and removing same under reduced pressure at 20° C. The residue was stirred with moist ethyl acetate until solid and the solids filtered off. Next, the solids were stirred with 95% ethanol (200 ml.) for one hour and filtered. There was obtained 2.5 g. of vacuum dried material. This was further purified and crystallized by stirring for 2 hours in a mixture of 12 ml. $H_2O$ and 12 ml. of "Amberlite LA–1" resin (acetate form) 25% in methyl isobutyl ketone (MIBK). The product was filtered off, washed with a little MIBK-$H_2O$ (1:1) and finally washed with acetone. The final yield was 450 mg. dec. 100° C. slowly. The IR and NMR were consistent with the desired structure.

Analysis.—Calcd. for $C_{18}H_{18}ClN_3O_7S$ (percent): C, 47.37; H, 3.94. Found (percent): C, 47.33; H, 4.98.

"Amberlite LA–1" is a high molecular weight, water-insoluble, liquid secondary amine, commercially available from Rohm and Haas Co. The acetate form used in this investigation was prepared as follows. To 1.0 l. of "Amberlite LA–1" and 3.0 l. of isobutyl methyl ketone was added 120 ml. of glacial acetic acid and the solution was stirred for 5 min. After stirring with 800 ml. of water for 25 min. the organic layer was separated for use.

More precisely, "Amberlite LA–1" is a mixture of secondary amines wherein each secondary amine has the formula

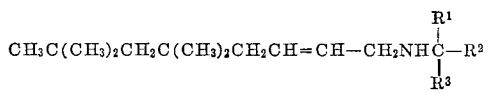

wherein each of $R^1$, $R^2$ and $R^3$ is an aliphatic hydrocarbon radical and wherein $R^1$, $R^2$, and $R^3$ contain in the aggregate from 11 to 14 carbon atoms; this particular mixture of secondary amines, which is sometimes referred to in the following examples as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4%, 160 to 210° C.—5%, 210 to 220° C.—74%, above 220° C.—17%.

D-(—)-α-(p-hydroxyphenyl) - α - (t-butoxy-carbonylamino)acetic acid.—To a stirred suspension of 8.35 g. (0.05 mole) of D-(—)-2-(p-hydroxyphenyl)glycine (finely ground) and 8 g. (0.2 mole) of powdered magnesium oxide in 225 ml. of 1:1 dioxane-water was added 14.3 g. (0.10 mole) of t-butoxycarbonylazide (Aldrich Chemical Company Inc.) over a 30 minute period and then stirring continued for 20 hours at 45°–50° C. The resulting turbid solution was then poured into one liter of ice water with stirring. One 600 ml. ethyl acetate extract was taken and this was washed twice with 200 ml. portions of 5% sodium bicarbonate and these aqueous solutions combined and filtered. Next, with cooling, they were acidified to pH 3 with 40% phosphoric acid under a layer of 500 ml. of ethyl acetate. This ethyl acetate extract was separated and combined with two more 100 ml. ethyl acetate extracts and dried over sodium sulfate. The ethyl acetate solution was then filtered and concentrated under reduced pressure to an oil and 100 ml. of warm benzene added. The resulting solution was filtered and scratched. There was obtained 10.8 g. of crystalline material, D-(—)-α-(p-hydroxyphenyl)-α-(t-butoxycarbonylamino)acetic acid. Infrared and NMR analysis revealed only the $NH_2$ group had reacted with the azide.

*Analysis.*—Calc'd for $C_{13}H_{17}NO_5$ (percent): C, 58.43; H, 6.48; N, 5.25. Found (percent): C, 62.46; H, 6.55; N, 4.56.

7 - [D - α - (t - butoxycarbonylamino)-α-(p-hydroxyphenyl)-acetamido]cephalosporanic acid. — (A) To a stirred solution of 5.35 g. (0.02 mole) of D-(—)-α-(p-hydroxyphenyl)-α-(t - butoxycarbonylamino)acetic acid, 2.02 g. (0.02 mole) of 2,6-lutidine and 50 ml. of tetrahydrofuran at −10° C. was added all at once 2.16 g. (0.02 mole) of ethyl chloroformate. After 20 minutes an ice cold solution of 5.44 g. (0.02 mole) of 7-aminocephalosporanic acid and 5 g. of sodium bicarbonate in 50 ml. of water was added, all at once with vigorous stirring. The temperature was kept at or below 0° C. for 10 minutes and between 0° C. and +10° C. for 90 minutes. Next, 100 ml. of water was added and the tetrahydrofuran removed in vacuo at 20° C. One 200 ml. ether extract was taken and discarded. The aqueous phase was layered with 200 ml. of methyl isobutyl ketone and cooled and stirred while being acidified to pH 2. The methyl isobutyl ketone layer was washed with two 100 ml. portions of water, dried briefly over sodium sulfate, filtered and treated with 7 ml. (0.2 mole) of 50% NaEH (sodium 2-ethylhexanoate in n-butanol). An oily precipitate separated and slowly crystallized. After one hour, the crystals were collected, washed with methyl isobutyl ketone and air dried. After further drying over phosphorus pentoxide (vacuum) there was obtained 5.24 g. dec. slowly above 100° C. The infrared and NMR spectra were consistent with the structure of sodium 7-[D-α-(t-butoxycarbonylamino)-α-(p-hydroxyphenyl) - acetamido]cephalosporanate.

The free acid 7-[D-α-(t-butoxycarbonylamino)-α-(p-hydroxyphenyl)-acetamido]cephalosporanic acid was obtained as an amorphous gum by extracting an acidic aqueous solution with ethyl acetate and concentrating under reduced pressure.

(B) (Alternate procedure).—To a stirred solution of 5.35 g. (0.02 mole) of D-(—)-α-(p-hydroxyphenyl)-α-(t-butoxycarbonylamino)acetic acid, 100 ml. of tetrahydrofuran, and 2.8 ml. 0.02 mole) of triethylamine at −40° C. was added dropwise 3.64 g. (0.02 mole) of trichloroacetic acid in 25 ml. of tetrahydrofuran over a 20 minute period. Next, after an additional 15 minutes a solution of 5.44 g. (0.02 mole) of 7-aminocephalosporanic acid and 5.6 ml. (0.04 mole) of triethylamine in 300 ml. of methylene chloride precooled to −40° C. was added all at once and the temperature maintained at −40° C. to −30° C. for 45 minutes. The mixture was then concentrated under reduced pressure at 20° C. to an oil. This was taken up in 200 ml. of 2% aqueous sodium bicarbonate and 200 ml. of ether. The ether layer was discarded and the aqueous phase layered with 200 ml. of ethyl acetate and, with cooling and stirring, the mixture acidified to pH 3. The ethyl acetate layer was then separated and washed twice with water, dried briefly over sodium sulfate, filtered and evaporated to an oil under reduced pressure at 20° C. Five hundred ml. of ether was then added and a small amount of insoluble material filtered off. The ether solution was then concentrated to about 200 ml. and then 200 ml. of "Skellysolve B" (petroleum ether) was added. The precipitate which formed was separated by filtration and consisted of the desired product, 7-[D-α-(t-butoxycarbonylamino) - α - (p - hydroxyphenyl) - acetamido] cephalosporanic acid. Yield=6 g.

7 - [D - α - amino - α - (p - hydroxyphenyl) - acetamido]cephalosporanic acid.—7 - [D - α - (t - butoxycarbonylamino) - α - (p - hydroxyphenyl) - acetamido]cephalosporanic acid (6 g.) was dissolved in 100 ml. of 50% aqueous formic acid and stirred at 40° C. for 3 hours. The solution was then treated with 1 g. of decolorizing carbon and filtered. The filtrate was concentrated to a viscous oil at 20° C. under reduced pressure. The last traces of formic acid were removed by adding 300 ml. of toluene and removing same under reduced pressure at 20° C. The resulting glass was triturated with 400 ml. of ethyl acetate to which 5 ml. of water had been added. A semi-crystalline solid formed which was filtered off and vacuum dried over phosphorus pentoxide. The product, 7 - [D - α - amino - α - (p - hydroxyphenyl)-acetamido]-cephalosporanic acid, weighed 1.8 g. and had a decomposition point of 260° C. with darkening above 150° C. Infrared and NMR spectra were consistent with the structure.

*Analysis.*—Calc'd for $C_{18}H_{19}N_3O_7S$ (percent): C, 51.07; H, 4.55. Found (percent): C, 51.58; H, 5.12.

D - (—) - α - benzyloxycarbonylamino - α - (4 - benzyloxycarbonyloxyphenyl)-acetic acid.—To a stirred suspension of 5.01 g. (0.03 mole) of D-(—)-2-(p-hydroxyphenyl)glycine in 100 ml. of water at 22° C. room temperature was added 1.2 g. (0.03 mole) of sodium hydroxide pellets. A clear solution resulted. The stirred solution was cooled to 0° C. and 2.4 g. (0.06 mole) of NaOH pellets were added. When they had dissolved 13.6 g. (0.08 mole of carbobenzoxy chloride was added all at once with vigorous stirring. After 30 min. at 0° C. to 5° C. the pH was 7 and a few drops of 50% $NaOH-H_2O$ was added to keep the pH at 8–9 during another 30 min. Three hundred ml. of $H_2O$ was then added and the resulting slurry was transferred to a separatory funnel and 500 ml. of ether added. After shaking, the ether layer was discarded and the aqueous layer and solids combined with 300 ml. of ethyl acetate and the mixture acidified with shaking to pH 2 with 6 N HCl. The ethyl acetate phase was combined with two more ethyl acetate extracts and washed with two 100 ml. portions of water, two 300 ml. portions of saturated $Na_2SO_4$ solution and filtered. Upon concentrating under reduced pressure to an oil the product crystallized. The material was recrystallized from benzene-"Skellysolve B" (pet. ether) to give 8.9 g. of D-(—)-α-benzyloxycarbonylamino - α - (4 - benzyloxycarbonyloxyphenyl) acetic acid with a melting point of 101°–102° C.

Analysis.—Calcd. for $C_{24}H_{21}NO_7$ (percent): C, 66.21; H, 4.88; N, 3.22. Found (percent): C, 67.93; H, 5.24; N, 3.07.

7 - [D - α - amino - α - (p - hydroxyphenyl) - acetamido]cephalosporanic acid.—D - (—) - α - benzyloxycarbonylamino - α - (4 - benxyloxycarbonyloxyphenyl)- acetic acid (0.344 mole) is dissolved in 100 mls. of dimethylformamide. There is then added 2,6-lutidine (3.7 gms.; 0.0244 mole) and the solution is cooled to 5° C. in an ice bath. Ethyl chloroformate (3.72 gms.; 0.0344 mole) is added to the cool solution over a period of five minutes. The mixture is stirred for 15 minutes and a solution of 7-aminocephalosporanic acid (0.395 mole) in 70 mls. of water and 20 mls. of 2,6-lutidine is added. The solution is stirred in the ice bath for 15 minutes, diluted with 500 mls. of water and extracted twice with ether. The ether extract is discarded. The pH of the solution is lowered to 2 by the addition of dilute $H_2SO_4$ and the product is extracted into ether. The ether extract is washed with water and the product is extracted into dilute $Na_2CO_3$. This extract has a pH of 7.5 and a volume of about 300 mls. It is then shaken with 7 gms. of 30% palladium on "Celite" for 20 minutes under an atmosphere of hydrogen at a pressure of 50 p.s.i. The volume of the solution is doubled by the addition of water and the pH is lowered to 2 by the addition of dilute $H_2SO_4$. The catalyst is then removed by filtration and the filtrate is extracted with a mixture of 150 mls. of methyl isobutyl ketone and 8 gms. of "Aerosol O.T." The extract is dried over anhydrous $Na_2SO_4$ and neutralized to pH 4.5 by the addition of triethylamine and an amorphous solid is collected by filtration and slurried with 20 mls. of water. A crystalline solid is formed which is collected and dried in vacuo over $P_2O_5$. This product, 7-[D-α-amino-α-(p-hydroxyphenyl)-acetamido]cephalosporanic acid, is found to contain the β-lactam structure as shown by infrared analysis.

"Celite" is diatomaceous earth. "Aerosol O.T." is dioctyl sodium sulfosuccinate.

D - α - t - butoxycarboxamido - 4 - acteamidophenylacetic acid.—A mixture of D-α-amino-4-acetamidophenylacetic acid (0.0205 mole), 3.2 g. (0.022 mole) of t-butoxycarbonyl azide, 1.65 g. (0.041 mole) of magnesium oxide and 100 ml. of 50% aqueous dioxane was stirred for 20 hours under a nitrogen atmosphere. The reaction mixture was poured into 400 ml. of ice water plus 300 ml. of ethyl acetate. The ethyl acetate phase was twice extracted with dilute aqueous sodium bicarbonate solution, the extracts being combined with the aqueous phase. The aqueous phase was acidified to pH 4 with 42% phosphoric acid and extracted with five 100-ml. portions of ethyl acetate. The combined and dried (sodium sulfate) ethyl acetate extract was stripped of solvent at reduced pressure. A solution of the residue in a minimum amount of chloroform was added to a large volume of "Skellysolve B" (petroleum solvent B.P. 60–68° C., essentially n-hexane) to yield 5.6 g. of D-α-t-butoxycarboxamido-4-acetamidophenylacetic acid as an amorphous solid. The infrared and nuclear magnetic resonance (NMR) spectra were consistent with the desired product.

7 - (D - α - amino - 4 - acetamidophenylacetamido)- cephalosporanic acid.—A solution of 5.6 g. (0.0182 mole) of D - α - t - butoxycarboxamido - 4 - acetamidophenylacetic acid and 2.58 ml. (0.0182 mole) of triethylamine in 50 ml. of tetrahydrofuran was cooled to —45° C. (crystallization) and 2.04 ml. (0.0182 mole) of tri- chloroacetyl chloride was added dropwise during 5 minutes at —45° C. After stirring for 10 minutes a cold (—50°) filtered solution of 4.96 g. (0.0182 mole) of 7-aminocephalosporanic acid and 5.1 ml. (0.0364 mole) of triethylamine in 250 ml. of methylene chloride was added in one portion. The reaction mixture was stirred at —45° C. for one-half hour, then the cooling bath was removed and the temperature allowed to rise to 0°. The solvent was removed at reduced pressure. Water and ether were added to the residue. The ether phase was extracted once with aqueous sodium bicarbonate solution and the extract combined with the aqueous phase. The aqueous solution was acidified with 42% phosphoric acid and extracted twice with ethyl acetate. The combined ethyl acetate extracts were twice washed with water, dried over anhydrous sodium sulfate and the solvent removed at reduced pressure. Trituration of the residue gave a solid which was dissolved in chloroform. Crystalline 7-(D-α-butoxycarboxamido - 4 - acetamidophenylacetamido) - cephalosporanic acid separated; weight 2.6 g.

7-(D-α-t-butoxycarboxamido - 4 - acetamidophenylacetamido)-cephalosporanic acid (2.45 g.) was added to 74 ml. of 45% aqueous formic acid and the solution was stirred at 40° for 3 hours. The water and formic acid were distilled off at reduced pressure, toluene finally being added and distilled off to remove any remaining water and formic acid. The residue was triturated with wet ethyl acetate, concentrated somewhat to remove water, finally more ethyl acetate was added giving a filterable solid. The solid was triturated with 95% ethanol yielding, after drying in vacuo over phosphorus pentoxide, 1.4 g. of 7 - (D-α-amino-4-acetamidophenylacetamido)-cephalosporanic acid. The infrared and nuclear magnetic resonance spectra were consistent with the desired product.

D-α-t-butoxycarboxamido - 3 - acetamidophenylacetic acid.—D-α-amino-3-acetamidophenylacetic acid (6.9 g., 0.0331 mole), 2.67 g. (0.0662 mole) of magnesium oxide and 5.23 g. (0.0365 mole) of t-butoxycarbonyl azide were combined in 84 ml. of 50% aqueous dioxane. After 15 minutes of stirring, an additional 40 ml. of 50% aqueous dioxane was added. The mixture was stirred at 45 to 50° for 24 hours. The reaction mixture was poured into 400 ml. of cold water plus 300 ml. of ethyl acetate; the whole was then filtered to remove a small amount of insoluble material. The ethyl acetate phase was once extracted with dilute aqueous sodium bicarbonate and this combined with the aqueous phase. The cold aqueous solution was adjusted to pH 4 with 42% phosphoric acid and extracted with ethyl acetate. The ethyl acetate extract was washed three times with water, dried with anhydrous sodium sulfate and stripped of solvent at reduced pressure. The residue was dissolved in anhydrous ether and diluted with "Skellysolve B" giving 5.9 g. of D-α-t-butoxycarboxamido - 3-acetamidophenylacetic acid as an amorphous solid. The infrared and nuclear magnetic resonance spectra were consistent with the desired product.

7-(D-α-t-butoxycarboxamido - 3 - acetamidophenylacetamido)-cephalosporanic acid.—A cold (0 to 5° C.) solution of 4.86 g. (0.0178 mole) of 7-aminocephalosporanic acid and 2.5 ml. (0.0178 mole) of triethylamine in 25 ml. of water plus 25 ml. of tetrahydrofuran was added in one portion to the vigorously stirred mixed anhydride prepared from 5.5 g. (0.0178 mole) of D-α-t-butoxycarboxamido - 3 - acetamidophenylacetic acid, 2.5 ml. (0.0178 mole) of triethylamine and 1.7 ml. (0.018 mole) of ethyl chloroformate in 75 ml. of tetrahydrofuran at —8 to —10° C. The mixture was stirred at about —8° C. for 50 minutes then the cooling bath was removed and the mixture was stirred for 10 minutes. An additional 30 ml. of water was added. Most of the tetrahydrofuran was removed at reduced pressure. The aqueous concentrate was extracted three times with ethyl acetate, the ethyl acetate extracts being discarded. The aqueous phase was acidified with 42% phosphoric acid and extracted three times with ethyl acetate. A small amount of insoluble material was removed by filtration during the first extraction. The combined ethyl acetate extracts were dried with anhydrous sodium sulfate, the solvent removed at reduced pressure and the residue triturated with anhydrous ether giving 6.2 g. of 7-(D-α-t-butoxycarboxamido - 3 - acetamidophenylacetamido)-cephalosporanic acid as an amorphous solid. The infrared and nuclear magnetic resonance spectra were consistent with the desired product.

7-(D-α-amino - 3 - acetamidophenylacetamido)-cephalosporanic acid.—Six g. of 7 - (D - α-t-butoxycarboxamido - 3 - acetamidophenylacetamido)-cephalosporanic acid was added to 180 ml. of 44% aqueous formic acid. At first a solution was obtained and then a crystalline solid separated accompanied by gas evolution. The reaction mixture was stirred at 39 to 40° for 3 hours. The crystalline solid was filtered from the cooled reaction mixture and identified as 7-(D-α-t-butoxycarboxamido-3-acetamidophenylacetamido)-cephalosporanic acid, weight 2.1 g. having the following analysis (values corrected for 4.59% water): C, 53.6; H, 5.17; N, 10.08.

Calc'd for $C_{25}H_{30}N_4O_9S$ (percent): C, 53.4; H, 5.38; N, 9.96.

The solvent was evaporated from the filtrate at reduced pressure. Toluene was added to the residue and this evaporated at reduced pressure to completely remove water and formic acid. This was repeated three times. The residue was triturated with wet ethyl acetate and then with anhydrous ether giving crude 7-(D-α-amino-3-acetamidophenylacetamido)-cephalosporanic acid as a filterable solid; weight 3.8 g. This crude product (3.5 g.) was combined with a two-phase system of water and ethyl acetate, a small amount of dark colored impurity being removed by filtration. The filtrate was concentrated to a small volume at reduced pressure. The aqueous concentrate deposited a small amount of crystalline impurity which was removed by filtration. The aqueous filtrate was concentrated to dryness, the residue triturated with anhydrous ether and collected by filtration giving 1.6 g. of 7-(D-α-amino - 3 - acetamidophenylacetamido)-cephalosporanic acid. The infrared and nuclear magnetic resonance spectra were consistent with the desired product.

D - α - t - butoxycarboxamido-m-hydroxyphenylacetic acid.—D - α - amino-m-hydroxyphenylacetic acid hydrobromide monohydrate (2.9 g.) in 25 ml. of water was adjusted to pH 4.5 with aqueous sodium hydroxide. Dioxane (25 ml.), 0.97 g. of magnesium oxide, and 3.43 g. of t-butoxycarbonyl azide were added and the mixture stirred overnight at 30°–40° C. under a blanket of nitrogen. The reaction mixture was poured into about 1 liter of ice water and 200 ml. of ethyl acetate. A small amount of solid was removed by filtration. The filtrate was separated into its components and the ethyl acetate phase was extracted with 50 ml. portions of 3% sodium bicarbonate solution. These extracts were combined with the aqueous phase and the solution cooled and acidified to pH 4.5 with 42% phosphoric acid. The product was extracted with five 70 ml. portions of ethyl acetate and the combined extracts washed with water and dried with anhydrous sodium sulfate.

The solvent was evaporated at reduced pressure giving 1.7 g. of D-α-t-butoxycarboxamido-m-hydroxyphenylacetic acid as an oil.

An equivalent amount of either D-α-amino-m-hydroxyphenylacetic acid or the hydrochloride monohydrate may be substituted for the amino acid hydrobromide monohydrate.

7 - (D-α-t-butoxycarboxamido-m-hydroxyphenyl-acetamido)cephalosporanic acid.—Ethyl chloroformate (0.57 ml., 0.006 mole) was added to a solution prepared from 1.7 g. (0.006 mole) of D-α-t-butoxycarboxamido-m-hydroxyphenylacetic acid. 0.84 ml. (0.006 mole) of triethylamine and 50 ml. of tetrahydrofuran at −10° C. The mixture was stirred at −10° C. for about 15 minutes to complete the formation of the mixed anhydride. A cold (0°) solution of 1.63 g. (0.006 mole) of 7-aminocephalosporanic acid, 0.84 ml. (0.006 mole) of triethylamine, 25 ml. of water, and about 25 ml. of tetrahydrofuran was added to the mixed anhydride and the reaction mixture stirred at 0°–4° C. for one and one-half hours. The tetrahydrofuran was evaporated at reduced pressure. The aqueous residue was extracted once with ethyl acetate (discarded), then layered with ethyl acetate and acidified with 42% phosphoric acid. The aqueous phase was extracted with two additional portions of ethyl acetate. The combined ethyl acetate extracts were washed with cold water, dried with anhydrous sodium sulfate, and the solvent evaporated at reduced pressure. The residue was triturated with "Skellysolve B", benzene, and again with "Skellysolve B." There was obtained, after drying, 1.8 g. of 7 - (D-α-t-butoxycarboxamido-m-hydroxyphenylacetamido)cephalosporanic acid. The infrared spectrum was consistent with the desired product.

7 - (D - α-amino-m-hydroxyphenylacetamido)cephalosporanic acid.—A solution of 1.8 g. of 7-(D-α-t-butoxycarboxamido - m - hydroxyphenylacetamido)cephalosporanic acid in 53 ml. of 45% aqueous formic acid was stirred at 40° C. for three hours. The volatile materials were evaporated at reduced pressure. The last traces of water and formic acid were removed by azeotropic distillation with toluene under reduced pressure. The oily residue was triturated with wet ethyl acetate giving a filterable solid. The solid was collected by filtration, washed with ethyl acetate and dried in vacuo giving 890 mg. of 7-(D-α - amino - m - hydroxyphenylacetamido)cephalosporanic acid. The infrared and nuclear magnetic resonance spectra were consistent with the desired product.

Analysis.—Calc'd for $C_{18}H_{19}O_7N_3S$ (percent): C, 51.30; H, 4.54; N, 9.97. Found (percent): C, 48.59; H, 5.02; N, 9.00; $H_2O$, 5.2. Found values corrected for 5.2% $H_2O$: C, 51.3; H, 4.4; N, 9.5.

D(−)-α-carbobenzoxyaminothienyl - 3 - acetic acid.— 5.0 g. (.0318 mole) of D(−)-3-thienylglycine was dissolved in a solution of 2.5 g. (.0625 mole) of sodium hydroxide in 35 ml. of water. The resulting solution was cooled to 0° C. and 5.91 g. (.0348 mole) of carbobenzoxy chloride was added dropwise with stirring. After the addition was completed, the reaction mixture was stirred for 2 hr. at 0–10° C. The solution was extracted with 35 ml. of ether. The aqueous phase was acidified with concentrated hydrochloric acid and a solid was removed by filtration. The filtrate was extracted with 2× 50 ml. portions of ethyl acetate. The combined extracts were dried over anhydrous magnesium sulfate and evaporated to dryness to yield 7.36 g. (80%) of D(−)-α-carbobenzoxyaminothienyl-3-acetic acid.

7-(D-α-carbobenzoxyaminothienyl - 3′ - acetamido)-cephalosporanic acid.—To a stirred suspension of 7.25 g. (.0254 mole) of D(−)-α-carbobenzoxyaminothienyl - 3-acetic acid in 120 ml. of dry tetrahydrofuran containing 3.55 ml. (.0254 mole) of triethylamine, was added at 0–5° C. 3.0 g. (.0254 mole) of trimethylacetyl chloride. After being stirred for 8 minutes at 0° C. the mixture was treated with a solution containing 6.94 g. (.0254 mole) of 7-aminocephalosporanic acid, 7.1 ml. (.0508 mole) of triethylamine, 60 ml. of tetrahydrofuran and 60 ml. of water. The reaction mixture was then stirred for 40 minutes at 0° C. and for 1 hr. at 0–8° C. and was then diluted with 200 ml. of water. The tetrahydrofuran was removed under reduced pressure, and the residue was layered with ethyl acetate and acidified to pH 2.5 with 42% phosphoric acid. An emulsion formed, and this was filtered through "Supercel" and the layers were separated. The aqueous phase was separated and extracted with fresh ethyl acetate. The combined extracts were washed with 50 ml. of saturated salt solution and were dried over anhydrous magnesium sulfate. Evaporation of the solvent afforded a solid which was triturated with dry ether. The product was collected by filtration and dried to give 3.95 g. (28.4%) of 7 - (D)-α-carbobenzoxyaminothienyl -3' - acetamido)cephalosporanic acid. It was characterized by its infrared spectrum (cm.$^{-1}$) (KBr disc): amide NH, 3300; carboxyl OH and adsorbed $H_2O$, 2400–3600; β-lactam carbonyl, 1775; acetate, carboxyl, carbamate and amide carbonyls 1660–1725.

Sodium 7-(D-α-aminothienyl - 3' - acetamido)-cephalosporanate.—A solution containing 3.95 g. (.00725 mole) of 7 - (D - α - carbobenzoxyaminothienyl - 3' - acetamido-cephalosporanic acid, 40 ml. of 1,4-dioxane, 200 ml. of water and 13 ml. of saturated sodium bicarbonate solution was shaken in an atmosphere of hydrogen at an initial pressure of 50 p.s.i. in the presence of 3.98 g. of 30% palladium-on-diatomaceous earth catalyst for 5 min. The reaction mixture was acidified to pH 2 with 6 N hydrochloric acid and was immediately filtered through "Super-cel" to remove the catalyst. To the filtrate was added saturated sodium bicarbonate solution to bring the pH to 3.8. 250 ml. of n-butanol was also added and the mixture was evaporated to dryness under reduced pressure. The residue was triturated with ether and the solid was collected and dried in vacuo. It was suspended in 5 ml. of methylene chloride containing 0.28 ml. of triethylamine. The slurry was stirred for 15 min. and then filtered. To the filtrate was added 0.332 g. of sodium 2-ethylhexanoate (50% solution in ether) followed by 25 ml. of dry ether. The sodium salt which formed was collected by filtration, washed with dry ether and dried in vacuo over phosphorus pentoxide to afford a yeild of 0.34 g. of sodium 7-(D-α-aminothienyl - 3' - acetamido) - cephalosporanate. The infrared spectrum (KBr disc) showed the following absorptions (cm.$^{-1}$): $NH_2$ and NH, 3200–3600; β-lactam, and acetate carbonyls, 1760; amide carbonyl 1670; carboxylate, 1600.

*Analysis.*—Calcd. for $C_{16}H_{16}N_3O_6S_2Na$ (percent): C, 44.34; H, 3.72. Found (percent): C, 44.21; H, 5.34.

Sodium D(—) - α - [(1 - carbomethoxypropene-2-yl)amino]thienyl-3-acetate.—0.745 g. (.0324 mole) of metallic sodium was dissolved in 100 ml. of hot 2-propanol. 5.10 g. (.0324 mole) of methyl acetoacetate were added to the solution, and the mixture was stirred and heated under reflux for 1½ hr. The hot solution was filtered and the filtrate was allowed to cool to 5° C. The crystalline product which precipitated was collected by filtration and dried in vacuo over phosphorus pentoxide to afford 7.0 g., 78% of colorless needles of sodium D(—)-α - [(1 - carbomethoxypropene - 2 - yl)amino]thienyl-3-acetate, M.P. 209–212° decomp. An analytical sample was prepared by recrystallization from hot 2-propanol to give colorless rosettes of M.P. 215–217°. Infrared spectrum (KBr disc. absorptions at 1645 cm.$^{-1}$ for carbonyl and 1575 cm.$^{-1}$ for carboxylate) and N.M.R. spectrum (solution in $D_2O$) were consistent with the desired structure; the N.M.R. spectrum showed the sample contained 2-propanol.

*Analysis.*—Calcd. for $C_{11}H_{12}NO_4SNa \cdot C_3H_8O$ (percent): C, 49.84; H, 5.98; N, 4.15. Found (percent): C, 49.07, 48.85; H, 5.65, 6.04; N, 4.40.

7 - [2',2' - dimethyl - 5' - oxo - 4' - (3'' - thienyl)-1'-imidazolidinyl] - 3 - acetoxymethyl - Δ$^3$ - cephem-4-carboxylic acid.—A solution of 1.08 g. (.01 mole) of ethyl chloroformate in 35 ml. of acetone containing 3 drops of N,N-dimethylbenzylamine was cooled to —5° C. With stirring, 2.77 g. (.01 mole) of powdered sodium D(—)-α - [(1 - carbomethoxypropene - 2 - yl)amino]thienyl-3-acetate was added, and the mixture was stirred for 20 min. at —5° to 0° C. A solution of 2.72 g. (.01 mole) of 7-aminocephalosporanic acid was prepared in 15 ml. of water by the dropwise addition of triethylamine to pH 8.0. 15 ml. of acetone was added and the chilled solution was added with stirring to the solution of the mixed anhydride previously described. After the addition was completed, the mixture was stirred for 1 hr. at 0° C. It was then filtered and the acetone was removed by evaporation under reduced pressure. The residue was shaken briefly with 40 ml. of methyl isobutyl ketone and 5 ml. of 88% formic acid. The mixture was filtered through "Super-cel" and the 2-phase filtrate was stirred for 1 hr. at 0° C. and then stored for 18 hr. at 0° C. An amorphous pale tan solid was collected by filtration and dried in vacuo over phosphorus pentoxide. This process afforded 0.212 g., 5% of crude 7-[2',2'-dimethyl - 5' - oxo - 4'' - (3''-thienyl)-1' - imidazolidinyl] - 3 - acetoxymethyl - Δ$^3$ - cephem - 4-carboxylic acid.

A suspension of 206 mg. (5 mole) of this material and 51 mg. (.5 mmole) of triethylamine in 5 ml. of dry acetone was stirred for 65 hr. at 23° C. The mixture was filtered and the filtrate was evaporated to dryness. The residue was suspended in water and the pH was adjusted to 3.5 with 20% phosphoric acid to give cream-colored, solid 7 - [2',2' - dimethyl - 5' - oxo - 4' - (3'' - thienyl)-1'-imidazolidinyl] - 3 - acetoxymethyl - Δ$^3$ - cephem - 4 - carboxylic acid, which was collected by filtration, washed with cold water and dried in vacuo over phosphorus pentoxide. The infrared spectrum (KBr disc) had absorptions (cm.$^{-1}$) for NH, 3350; β-lactam carbonyl, 1780; acetate, carboxyl and imidazolidinone carbonyls, 1740–1700, acetate, 1230.

D(—) - α - t - butoxycarboxamido - 3 - thienylacetic acid.—An intimate mixture of 15.72 g. (0.1 mole) of D(—) - 3 - thienylglycine and 8.06 g. (0.2 mole) of magnesium oxide powder was suspended in 250 ml. of 50% aqueous dioxane. 28.6 g. (0.2 mole) of t-butoxycarbonyl azide was added dropwise with vigorous stirring, and the mixture was stirred for 20 hr. at 45–50°. The mixture was cooled, diluted with 1 l. of ice-water and stirred briefly with 250 ml. of ethyl acetate. The layers were separated and the organic phase was extracted with 50 ml. of 3% sodium bicarbonate solution and then with 50 ml. of water. All the aqueous fractions were then combined and the pH was lowered to 5 with 42% phosphoric acid. The product was extracted into 3× 250 ml. portions of ethyl acetate. The combined extracts were washed with water, dried over magnesium sulfate, and evaporated to dryness under reduced pressure. Trituration of the oily residue with ether and "Skellysolve B" gave 18.7 g. (72%) of crystalline D(—)-α-t-butoxycarboxamido - 3 - thienylacetic acid M.P. 102–103°. An analytical sample was recrystallized from ethyl acetate and Skellysolve B to give colorless needles, M.P. 104–105°, [α]$_D^{23}$ —107° (c.=1.0, $CH_3OH$).

Calcd. for $C_{11}H_{15}NO_4S$ (percent): C, 51.36; H, 5.88. Found (percent): C, 51.49; H, 5.56.

7-(D-α-t-butoxycarboxamido-3-thienylacetamido)cephalosporanic acid.—A solution of 12.87 (.05 mole) of D(—)-α-t-butoxycarboxamido - 3 - thienylacetic acid and 5.06 g. (.05 mole) of triethylamine in 200 ml. of dry tetrahydrofuran was cooled to —10°. 5.43 g. (.05 mole) of ethyl chloroformate was added dropwise with stirring and the resulting mixed anhydride solution was stirred for 12 min. at —10°. A chilled (5°) solution of 13.62 g. (.05 mole) of 7-aminocephalosporanic acid and 5.06 g. (.05 mole) of triethylamine in 200 ml. of 50% aqueous tetrahydrofuran was added in one portion. The reaction mixture was stirred for 1¼ hr. at 0° and after filtration the tetrahydrofuran was removed from the filtrate under reduced pressure. The residue was dissolved in a mixtrue of 300 ml. of water and 150 ml. of ethyl acetate. After a brief shaking, the layers were separated and the aqueous phase was cooled and acidified to pH 3 with 42% phosphoric acid. The product was extracted into 3× 200 ml. portions of ethyl acetate and the combined extracts were washed with water and dried over magnesium sulfate. Evaporation of the solvent left an oil which was solidified by trituration with ether and "Skellysolve B" to give 21.7 g. (85%) of 7-(D-α-t-butoxycarboxamido-3-thienylacetamido)cephalosporanic acid. It was characterized by its infrared spectrum (cm.$^{-1}$) (KBr disc): amide NH, 3340, β-lactam carbonyl, 1790; acetate, amide, carbamate and carboxyl carbonyls, 1750–1680; amide deformation 1520.

7-(D - α - amino - 3 - thienylacetamido)cephalosporanic acid.—A solution of 7.67 g. (.015 mole) of 7-(D-α-t-butoxycarboxamido - 3-thienylacetamido)-cephalosporanic acid in 400 ml. of 45% aqueous formic acid was stored at 40° for 3 hr. The solution was evaporated to dryness under reduced pressure and the last traces of formic acid were removed by azeotropic distillation with toluene under reduced pressure. The residue was triturated with a mixture of 40 ml. of ethyl acetate and 2 ml. of water, and then with ether to give 5.3 g. (86%) of 7-(D-α-amino-3-thienylacetamido)cephalosporanic acid. Infrared and N.M.R. spectra were fully consistent with the structure.

Calcd. for $C_{16}H_{17}N_3O_6S_2 \cdot H_2O$ (percent): C, 44.74; H, 4.46. Found (percent): C, 44.54; H, 4.83.

7-[2,2-dimethyl-5-oxo - 4 - (3-thienyl)-1-imidazolidinyl]cephalosporanic acid.—5.1 g. of 7-(D-α-amino-3-thienylacetamido)cephalosporanic acid was slurried in a mixture of 170 ml. of acetone and 130 ml. of methanol. 1.23 g. (1 equivalent) of triethylamine was added with stirring and the resulting solution was stirred for 16 hr. at room temperature. A small amount of insoluble material was removed by filtration and the filtrate was evaporated to dryness under reduced pressure. The residue was dissolved in a mixture of 60 ml. of water and 40 ml. of ethyl acetate. This mixture was cooled and the pH of the aqueous phase was lowered to 3.0 with 42% phosphoric acid with stirring. The layers were separated and the aqueous phase was extracted with 2× 60 ml. of fresh ethyl acetate. The combined extracts were washed with water and evaporated to dryness, and the solid residue was triturated with ether to give 2.1 g. (38%) of hydrated 7-[2,2-dimethyl-5-oxo-4-(3-thienyl)-1-imidazolidinyl]cephalosporanic acid. Infrared and N.M.R. spectra were fully consistent with the proposed structure.

Calcd. for $C_{19}H_{20}N_3O_6S \cdot \frac{1}{2} H_2O$ (percent): C, 49.66; H, 4.61. Found (percent): C, 49.48; H, 4.83.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A compound having the formula

[Structural formula]

wherein Ar is 2-thienyl, 3-thienyl or

[Structural formula with $R^1$ and $R^2$]

in which each of $R^1$ and $R^2$ is hydrogen, nitro, di(lower)alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl;

A is hydrogen, acetoxy, pyridinium, picolinium or lutidinium; and

M is hydrogen, a pharmaceutically acceptable, nontoxic cation or an anionic charge when A is one of said quaternary ammonium radicals.

2. A compound having the formula

[Structural formula]

wherein Ar is 2-thienyl, 3-thienyl or

[Structural formula with $R^1$ and $R^2$]

in which each of $R^1$ and $R^2$ is hydrogen, nitro, di(lower)alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl; and M is hydrogen or a pharmaceutically acceptable nontoxic cation.

3. A compound defined in claim 2 wherein Ar is 2-thienyl, 3-thienyl or phenyl.

4. A compound defined in claim 2 wherein Ar is 2-thienyl, 3-thienyl or phenyl and M is hydrogen.

5. A compound defined in claim 2 wherein Ar is 2-thienyl.

6. A compound defined in claim 2 wherein Ar is 3-thienyl.

7. A compound defined in claim 2 wherein Ar is phenyl.

8. 7-[D-α-(3-guanyl - 1 - ureido)-2-thienylacetamido]cephalosporanic acid.

9. 7-[D-α-(3-guanyl - 1 - ureido)-3-thienylacetamido]cephalosporanic acid.

10. 7-[D-α-(3-guanyl - 1 - ureido)phenylacetamido]cephalosporanic acid.

11. A compound having the formula

[Structural formula]

wherein Ar is 2-thienyl, 3-thienyl or

[Structural formula with $R^1$ and $R^2$]

in which each of $R^1$ and $R^2$ is hydrogen, nitro, di(lower)alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl; and M is hydrogen or a pharmaceutically acceptable nontoxic cation.

12. A compound defined in claim 11 wherein Ar is 2-thienyl, 3-thienyl or phenyl.

13. A compound defined in claim 11 wherein Ar is 2-thienyl, 3-thienyl or phenyl and M is hydrogen.

14. A compound defined in claim 11 wherein Ar is 2-thienyl.

15. A compound defined in claim 11 wherein Ar is 3-thienyl.

16. A compound defined in claim 11 wherein Ar is phenyl.

17. 7-[D-α-(3-guanyl - 1 - ureido)-2-thienylacetamido]desacetoxycephalosporanic acid.

18. 7-[D-α-(3-guanyl - 1 - ureido) - 3 - thienylacetamido]-desacetoxycephalosporanic acid.

19. 7 - [D - α - (3-guanyl-1-ureido)phenylacetamido]-desacetoxycephalosporanic acid.

20. A compound having the formula

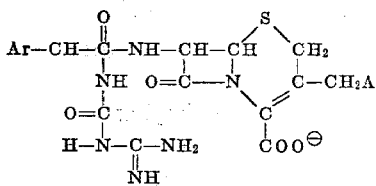

wherein Ar is 2-thienyl, 3-thienyl or

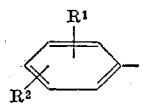

in which each of $R^1$ and $R^2$ is hydrogen, nitro, di(lower)-alkylamino, (lower)alkanoylamino, amino, hydroxy, (lower)alkanoyloxy, (lower)alkyl, (lower)alkoxy, sulfamyl, chloro, iodo, bromo, fluoro or trifluoromethyl; and A is pyridinium, picolinium or lutidinium.

21. A compound defined in claim 20 wherein Ar is 2-thienyl, 3-thienyl or phenyl.

22. A compound defined in claim 20 wherein Ar is 2-thienyl, 3-thienyl or phenyl and A is pyridinium.

23. A compound defined in claim 20 wherein Ar is 2-thienyl and A is pyridinium.

24. A compound defined in claim 20 wherein Ar is 3-thienyl and A is pyridinium.

25. A compound defined in claim 20 wherein Ar is phenyl and A is pyridinium.

26. A compound having the formula

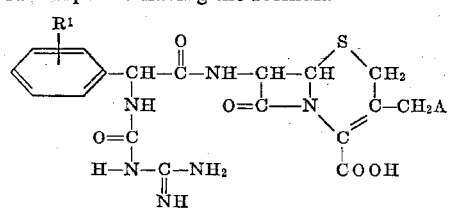

wherein $R^1$ is nitro, acetamido, methoxy, chloro, iodo or fluoro; and

A is hydrogen or acetoxy.

27. A compound having the formula

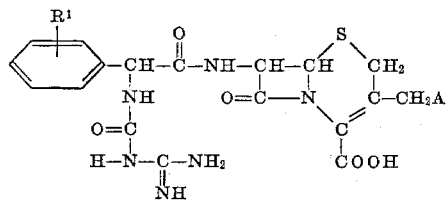

wherein $R^1$ is hydroxy or chloro; and

A is hydrogen or acetoxy.

References Cited

UNITED STATES PATENTS

| | | | |
|---|---|---|---|
| 3,457,257 | 7/1969 | Hanessian et al. | 260—239.1 |
| 3,481,922 | 12/1969 | Holdrege | 260—239.1 |
| 3,483,188 | 12/1969 | McGregor | 260—239.1 |

NICHOLAS S. RIZZO, Primary Examiner

U.S. Cl. X.R.

424—246